United States Patent
Okazaki

(10) Patent No.: US 7,389,174 B2
(45) Date of Patent: Jun. 17, 2008

(54) AIR/FUEL RATIO CONTROL APPARATUS FOR INTERNAL COMBUSTION ENGINE

(75) Inventor: Shuntaro Okazaki, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 99 days.

(21) Appl. No.: 10/593,877

(22) PCT Filed: Mar. 23, 2005

(86) PCT No.: PCT/JP2005/005985
§ 371 (c)(1), (2), (4) Date: Oct. 17, 2006

(87) PCT Pub. No.: WO2005/090765
PCT Pub. Date: Sep. 29, 2005

(65) Prior Publication Data
US 2008/0072884 A1 Mar. 27, 2008

(30) Foreign Application Priority Data
Mar. 24, 2004 (JP) ............................... 2004-086628

(51) Int. Cl.
*G06F 19/00* (2006.01)
*F02D 41/14* (2006.01)
*F01N 3/20* (2006.01)

(52) U.S. Cl. ............................ 701/109; 60/276; 60/285
(58) Field of Classification Search ................... 60/274, 60/276, 277, 285; 701/103–105, 109; 123/672, 123/674, 679
See application file for complete search history.

(56) References Cited

U.S. PATENT DOCUMENTS
5,099,647 A 3/1992 Hamburg
(Continued)

FOREIGN PATENT DOCUMENTS
EP 0 856 099 B1 6/2000
(Continued)

*Primary Examiner*—Willis R Wolfe, Jr.
(74) *Attorney, Agent, or Firm*—Oliff & Berridge, PLC

(57) ABSTRACT

Under the assumption that in-cylinder intake air quantities which are imbibed into a combustion chamber are constant, and on the basis of the relationship that the product between a command final fuel injection quantity Fi (Fi(k−M)) and a detection air/fuel ratio abyfs(k) becomes equal to the product between a target command basic fuel injection quantity Fbaset for making the actual air/fuel ratio of an engine a target air/fuel ratio abyfr(k) and a target air/fuel ratio abyfr (k), this air/fuel ratio control apparatus evaluates the quantity Fbaset (=(abyfs(k)/abyfr(k))Fi(k−M)), and it divides the quantity Fbaset by an uncorrected command basic fuel injection quantity Fbaseb(k), thereby to evaluate a basic-fuel-injection-quantity correction coefficient KF (=Fbaset/Fbaseb(k)). The uncorrected command basic fuel injection quantity Fbaseb at the next time is multiplied by coefficient KF, thereby to successively correct the next uncorrected command basic fuel injection quantity Fbaseb.

12 Claims, 10 Drawing Sheets

U.S. PATENT DOCUMENTS

| | | | |
|---|---|---|---|
| 5,157,920 A * | 10/1992 | Nakaniwa | 60/276 |
| 5,341,641 A | 8/1994 | Nakajima et al. | |
| 5,359,852 A | 11/1994 | Curran et al. | |
| 5,361,582 A * | 11/1994 | Uchida et al. | 60/276 |
| 5,568,725 A | 10/1996 | Uchikawa | |
| 5,983,629 A | 11/1999 | Sawada | |
| 6,014,963 A * | 1/2000 | Narita | 123/674 |
| 6,067,794 A | 5/2000 | Simon et al. | |
| 6,112,517 A | 9/2000 | Yasui et al. | |
| 6,253,542 B1 | 7/2001 | Omara et al. | |
| 6,453,665 B1 | 9/2002 | Bower, Jr. et al. | |
| 7,032,374 B2 * | 4/2006 | Okazaki et al. | 60/285 |
| 7,278,394 B2 * | 10/2007 | Okazaki et al. | 60/276 |
| 7,293,404 B2 * | 11/2007 | Enoki et al. | 60/276 |
| 2007/0084192 A1 * | 4/2007 | Wanibe | 60/274 |

FOREIGN PATENT DOCUMENTS

| | | |
|---|---|---|
| FR | 2 740 176 A1 | 4/1997 |
| JP | A-05-187297 | 7/1993 |
| JP | A 07-197837 | 8/1995 |
| JP | A 11-159376 | 6/1999 |
| JP | A-11-169670 | 6/1999 |
| JP | B2 3046948 | 3/2000 |
| JP | A-2000-508036 | 6/2000 |
| WO | WO 97/14877 A1 | 4/1997 |

* cited by examiner

AIR/FUEL RATIO CONTROL APPARATUS FOR INTERNAL COMBUSTION ENGINE

TECHNICAL FIELD

The present invention relates to an air/fuel ratio control apparatus for an internal combustion engine, wherein air/fuel ratio sensors are respectively provided in exhaust passage parts on the upstream side and downstream side of a catalyst (ternary catalyst) disposed in the exhaust passage of the internal combustion engine, and wherein the air/fuel ratio of the engine is feedback-controlled on the basis of the output values of the respective air/fuel ratio sensors.

BACKGROUND ART

Heretofore, the air/fuel ratio control apparatus of this type has been extensively known. In general, such an apparatus has an upstream-side air/fuel ratio sensor and a downstream-side air/fuel ratio sensor respectively interposed in exhaust passage parts on an upstream side and a downstream side with respect to a catalyst disposed in the exhaust passage of an internal combustion engine, and it calculates a sub-feedback correction magnitude on the basis of the difference between the output value of the downstream-side air/fuel ratio sensor and a predetermined downstream-side target value (by, for example, subjecting the difference to a proportional, integral and differential process (PID process)), while it calculates a main feedback correction magnitude on the basis of the difference between the output value of the upstream-side air/fuel ratio sensor and a predetermined upstream-side target value (by, for example, subjecting the difference to a proportional and integral process (PI process)). In addition, such an apparatus computes a command final fuel injection quantity which is obtained in such a way that a fuel quantity for obtaining a target air/fuel ratio (a command basic fuel injection quantity) as is acquired from an in-cylinder intake air quantity estimated on the basis of the running state of the engine (for example, an accelerator opening degree, an engine revolution speed, etc.) is corrected on the basis of the main feedback correction magnitude and the sub-feedback correction magnitude, and it instructs an injector to inject fuel of the command final fuel injection quantity, thereby to feedback-control the air/fuel ratio of a mixture which is fed into the engine.

Meanwhile, the catalyst (ternary catalyst) ordinarily has a so-called "oxygen occlusion function" owing to which, when the air/fuel ratio of exhaust gas flowing into the catalyst is a lean air/fuel ratio, the catalyst reduces nitrogen oxides (NOx) in the exhaust gas and keeps therein oxygen deprived of the nitrogen oxides, and when the air/fuel ratio of the exhaust gas flowing into the catalyst is a rich air/fuel ratio, the catalyst oxidizes HC, CO and the like unburned components in the exhaust gas by the kept oxygen. Accordingly, high frequency components of comparatively high frequencies in the fluctuations of the air/fuel ratio of the exhaust gas in the upstream of the catalyst, and low frequency components of comparatively low frequencies and comparatively small amplitudes (deviation magnitudes from a theoretical air/fuel ratio) can be completely absorbed by the oxygen occlusion function which the catalyst has, so that they do not appear as the fluctuations of the air/fuel ratio of the exhaust gas in the downstream of the catalyst.

On the other hand, low frequency components of comparatively low frequencies and comparatively large amplitudes in the fluctuations of the air/fuel ratio of the exhaust gas in the upstream of the catalyst are not completely absorbed by the oxygen occlusion function of the catalyst, and they somewhat later appear as the fluctuations of the air/fuel ratio of the exhaust gas in the downstream of the catalyst. As a result, there occurs a case where the output value of the upstream-side air/fuel ratio sensor and the output value of the downstream-side air/fuel ratio sensor become values which indicate air/fuel ratios deviating in directions opposite to each other relative to the theoretical air/fuel ratio. In this case, the air/fuel ratio control of the engine as based on a main feedback control (the main feedback correction magnitude) and the air/fuel ratio control of the engine as based on a sub-feedback control (the sub-feedback correction magnitude) interfere with each other, and hence, the favorable air/fuel ratio control of the engine cannot be performed.

For the above reason, the occurrence of the interference of the air/fuel ratio controls of the engine can be avoided, when the output value of the upstream-side air/fuel ratio sensor after the extent of frequency components that can appear as the fluctuations of the air/fuel ratio in the downstream of the catalyst have been cut from within the frequency components in the fluctuations of the output value of the upstream-side air/fuel ratio sensor (that is, low frequency components below a predetermined frequency) is used for the main feedback control.

On the basis of such knowledge, an engine control apparatus (air/fuel ratio control apparatus) stated in, for example, JP-A-5-187297 executes an air/fuel ratio control on the basis of a value obtained after the output value of an upstream-side air/fuel ratio sensor has been subjected to high-pass filtering, and the output value of a downstream-side air/fuel ratio sensor (in this example, a value obtained after the output value has been subjected to low-pass filtering). According to this, the occurrence of the interference of the air/fuel ratio controls of an engine as stated above can be avoided, and an air/fuel ratio control for the extent of fluctuations of an air/fuel ratio at or below a predetermined frequency that can appear as the fluctuations of an air/fuel ratio in the downstream of a catalyst (a substantial air/fuel ratio control) can be reliably performed by a sub-feedback control. Besides, high frequency components of or above the predetermined frequency in the fluctuations of the output value of the upstream-side air/fuel ratio sensor pass through a high-pass filter and therefore appear as the value obtained after the high-pass filtering. Accordingly, in such a case where the internal combustion engine is in a transient running state and where the air/fuel ratio of exhaust gas fluctuates greatly at the high frequencies of or above the predetermined frequency, an air/fuel ratio control for the fluctuations of the air/fuel ratio at or above the predetermined frequency (that is, a compensation for the abrupt change of the air/fuel ratio in the transient running state) can be performed rapidly and reliably by a main feedback control.

Meanwhile, in general, the difference between an in-cylinder intake air quantity, which is estimated in order to acquire a command basic fuel injection quantity, and an actual in-cylinder intake air quantity, and the difference between a command fuel injection quantity for an injector for injecting fuel and an actual fuel injection quantity (hereinbelow, these shall be generally termed the "error of the basic fuel injection quantity") occur inevitably. In order that the air/fuel ratio of a mixture to be fed into the engine may be converged to a target air/fuel ratio while such an error of the basic fuel injection quantity is being compensated (concretely, that the steady-state deviation between the output value of the air/fuel ratio sensor and the predetermined target value may be made "0"), a process for calculating a feedback correction magnitude (that is, an integral process (I process)) needs to be executed on the basis of the time integral value of the deviation between the output value of the air/fuel ratio sensor and the predetermined target value, in at least one of the main feedback control and the sub-feedback control.

However, the high-pass filtering is a process for achieving a function equivalent to a differential process (D process). In the apparatus stated in the above document, accordingly, although the main feedback control executes a process containing the integral process (for example, a proportional and integral process (PI process)), the integral process cannot, in effect, be executed in the main feedback control. In this case, accordingly, the integral process needs to be executed in the sub-feedback control.

However, the change of the air/fuel ratio of the mixture to be fed into the engine appears somewhat later as the change of the air/fuel ratio of the exhaust gas in the downstream of a catalyst, under the influence of the oxygen occlusion function of the catalyst as stated before. Consequently, in a case where the error of the basic fuel injection quantity increases rapidly, this error of the basic fuel injection quantity cannot be immediately compensated by only the sub-feedback control, resulting in the problem that there occurs a case where an emission exhaust quantity increases temporarily.

DISCLOSURE OF THE INVENTION

Accordingly, an object of the present invention is to provide, in an air/fuel ratio control apparatus for an internal combustion engine, wherein an upstream-side air/fuel ratio sensor and a downstream-side air/fuel ratio sensor are respectively provided in exhaust passage parts on the upstream side and downstream side of a catalyst disposed in the exhaust passage of the internal combustion engine, and wherein the air/fuel ratio of a mixture to be fed into the engine is feedback-controlled on the basis of a value obtained after the output value of the upstream-side air/fuel ratio sensor has been subjected to high-pass filtering, and the output value of the downstream-side air/fuel ratio sensor, an apparatus in which the error of a basic fuel injection quantity can be rapidly compensated while the air/fuel ratio of the mixture to be fed into the engine is being controlled toward a target air/fuel ratio.

A characterizing feature of the invention consists in that an air/fuel ratio control apparatus for an internal combustion engine as is applied to the internal combustion engine having a catalyst, an upstream-side air/fuel ratio sensor, a downstream-side air/fuel ratio sensor, and fuel injection means (for example, an injector) for injecting fuel in compliance with an instruction, comprises command basic-fuel-injection-quantity acquisition means for acquiring as a command basic fuel injection quantity, a fuel quantity for obtaining a target air/fuel ratio from an in-cylinder intake air quantity which is estimated on the basis of the running state of the internal combustion engine (for example, an accelerator opening degree, an engine revolution speed, etc.); main-feedback-correction-magnitude calculation means for calculating a main feedback correction magnitude on the basis of a value obtained after a value based on the difference between the output value of the upstream-side air/fuel ratio sensor and a predetermined upstream-side target value has been subjected to predetermined high-pass filtering, or a value obtained after the output value of the upstream-side air/fuel ratio sensor has been subjected to predetermined high-pass filtering; sub-feedback-correction-magnitude calculation means for calculating a sub-feedback correction magnitude on the basis of the output value of the downstream-side air/fuel ratio sensor and a predetermined downstream-side target value; command basic-fuel-injection-quantity correction means for correcting the command basic fuel injection quantity in order that the fuel quantity which the fuel injection means actually injects when the injection instruction of the fuel of the command basic fuel injection quantity has been received may become a quantity which is required for making the actual air/fuel ratio of the mixture to be fed into the engine, the target air/fuel ratio; command final-fuel-injection-quantity calculation means for calculating a command final fuel injection quantity in such a way that the corrected command basic fuel injection quantity is corrected by the main feedback correction magnitude and the sub-feedback correction magnitude; and air/fuel ratio control means for feedback-controlling the air/fuel ratio of the mixture to be fed into the engine, in such a way that the injection instruction of the fuel of the command final fuel injection quantity is given to the fuel injection means.

Herein, both the predetermined upstream-side target value and the predetermined downstream-side target value should appropriately be values corresponding to the target air/fuel ratio, and this target air/fuel ratio should preferably be set at a theoretical air/fuel ratio, except in a special case such as during the warming-up operation of the engine. Besides, the sub-feedback-correction-magnitude calculation means should appropriately be configured so as to calculate the sub-feedback correction magnitude on the basis of a value which is based on the difference between the output value of the downstream-side air/fuel ratio sensor and the predetermined downstream-side target value.

Here, the "value based on the difference between the output value of the sensor and the target value" is any of, for example, the difference between the output value of the sensor and the target value, the difference between a detection air/fuel ratio (actual air/fuel ratio) corresponding to the output value of the sensor and a target air/fuel ratio corresponding to the target value, and the difference between an actual in-cylinder fuel feed quantity, which is a value obtained in such a way that an in-cylinder intake air quantity is divided by a detection air/fuel ratio corresponding to the output value of the sensor, and a target in-cylinder fuel feed quantity, which is a value obtained in such a way that the in-cylinder intake air quantity is divided by a target air/fuel ratio corresponding to the target value, but these differences are not restrictive.

According to this, the command basic fuel injection quantity is corrected so that the fuel quantity which the fuel injection means actually injects when this means has received the injection instruction of the fuel of the command basic fuel injection quantity may become the quantity which is required for making the actual air/fuel ratio of the mixture to be fed into the engine, the target air/fuel ratio. In other words, the error of the basic fuel injection quantity can be immediately compensated without being influenced by the value of either of the main feedback correction magnitude and the sub-feedback correction magnitude.

In addition, the fuel injection means is instructed to inject the fuel of the command final fuel injection quantity calculated on the basis of the corrected command basic fuel injection quantity which is the value after the error of the basic fuel injection quantity has been compensated in this manner. Accordingly, even in a case, for example, where the error of the basic fuel injection quantity enlarges abruptly, the error of the basic fuel injection quantity can be rapidly compensated while the air/fuel ratio of the mixture to be fed into the engine is being controlled toward the target air/fuel ratio, with the result that the increase of emission attributed to the enlargement of the error of the basic fuel injection quantity can be suppressed.

In this case, the command basic-fuel-injection-quantity correction means should appropriately be configured so as to calculate a parameter value for correcting the command basic fuel injection quantity, on the basis of the output value of the upstream-side air/fuel ratio sensor, the command final fuel injection quantity, the target air/fuel ratio, and the command basic fuel injection quantity, and to correct the command basic fuel injection quantity by using the parameter value.

In general, under the assumption that the in-cylinder intake air quantities which are imbibed into a cylinder (into a combustion chamber) are constant, the product between the fuel injection quantity and the air/fuel ratio of the mixture to be fed into the engine (accordingly, the air/fuel ratio of the exhaust gas) becomes constant. Accordingly, there holds the relationship that the product between the command final fuel injection quantity and the air/fuel ratio corresponding to the output value of the upstream-side air/fuel ratio sensor (hereinbelow, sometimes termed the "detection air/fuel ratio") is equal to the product between the command basic fuel injection quantity (an injection command value for the fuel injection means, and this shall hereinbelow be sometimes termed the "target command basic fuel injection quantity"), which is required in order that the actual air/fuel ratio of the mixture to be fed into the engine may be made the target air/fuel ratio, and the target air/fuel ratio.

Accordingly, the target command basic fuel injection quantity can be calculated on the basis of the values of the command final fuel injection quantity, detection air/fuel ratio and target air/fuel ratio which are known, and the above relationship. When the target command basic fuel injection quantity can be calculated, the parameter value (for example, a correction coefficient) for correcting the command basic fuel injection quantity can be calculated on the basis of the result of the comparison between this target command basic fuel injection quantity and the command basic fuel injection quantity which is known (that is, the value itself which has been acquired by the command basic-fuel-injection-quantity acquisition means).

The parameter value for correcting the command basic fuel injection quantity as can be calculated in this way becomes a value for correcting the command basic fuel injection quantity in order that the fuel quantity which the fuel injection means actually injects when it has received the injection instruction of the fuel of the command basic fuel injection quantity may become the quantity which is required for making the actual air/fuel ratio of the mixture to be fed into the engine, the target air/fuel ratio (that is, a value for bringing the command basic fuel injection quantity into agreement with the target command basic fuel injection quantity). Accordingly, when the apparatus is configured so as to correct the command basic fuel injection quantity by using such a parameter value for correcting the command basic fuel injection quantity, as in the above configuration, the command basic fuel injection quantity can be corrected so as to agree with the target command basic fuel injection quantity by a simple computation and at a high precision, with the result that the error of the basic fuel injection quantity can be compensated rapidly and precisely while the air/fuel ratio of the mixture to be fed into the engine is being controlled toward the target air/fuel ratio.

In the case where the command basic fuel injection quantity is corrected using the parameter value for correcting the command basic fuel injection quantity, the parameter value for correcting the command basic fuel injection quantity as is calculated by the command basic-fuel-injection-quantity correction means should preferably have been subjected to predetermined low-pass filtering. In a case where the engine is in a transient running state, the air/fuel ratio of the exhaust gas, the command basic fuel injection quantity which is acquired by the command basic-fuel-injection-quantity acquisition means, and the command final fuel injection quantity which is calculated by the command final-fuel-injection-quantity calculation means can separately and independently fluctuate greatly at high frequencies of or above a predetermined frequency.

In such a case, there is the possibility that the relationship will fail to be held, and that the parameter value for correcting the command basic fuel injection quantity will be calculated as a value which differs from the value for bringing the command basic fuel injection quantity into agreement with the target command basic fuel injection quantity. In contrast, influences ascribable to the fluctuations of the high frequencies can be cut by subjecting the parameter value for correcting the command basic fuel injection quantity, to the predetermined low-pass filtering as stated above, with the result that, in the case where the engine is in the transient running state, the parameter value for correcting the command basic fuel injection quantity can be more precisely calculated as the value for bringing the command basic fuel injection quantity into agreement with the target command basic fuel injection quantity.

Besides, in the air/fuel ratio control apparatus according to the invention, in the case where the command basic fuel injection quantity is corrected using the parameter value for correcting the command basic fuel injection quantity, delay-time acquisition means is further comprised for acquiring a delay time which is involved since the injection instruction of the fuel until the air/fuel ratio of the exhaust gas based on the combustion of the fuel injected in compliance with the injection instruction appears as the output value of the upstream-side air/fuel sensor, and the command basic-fuel-injection-quantity correction means should appropriately be configured so as to use a value concerning the injection instruction, at a time preceding the delay time, as at least the command final fuel injection quantity, in calculating the parameter value for correcting the command basic fuel injection quantity.

In general, the injection (injection instruction) of the fuel is performed in an intake stroke (or at a time before the intake stroke), and the injected fuel is ignited (combusted) within the combustion chamber at a time in the vicinity of a compression top dead center which thereafter arrives. As a result, the exhaust gas which is produced is exhausted from the combustion chamber into an exhaust passage through an exhaust valve, and it thereafter moves within the exhaust passage, thereby to reach (the detection portion of) the upstream-side air/fuel ratio sensor. Further, a predetermined time period is required before the change of the air/fuel ratio of the exhaust gas having reached the detection portion of the upstream-side air/fuel ratio sensor appears as the change of the output value of the sensor.

For the above reason, a delay time which is ascribable to a delay concerning a combustion stroke (stroke delay), a delay concerning the movement of the exhaust gas within the exhaust passage (transport delay), and a delay concerning the response of the upstream-side air/fuel ratio sensor (response delay) are required since the injection instruction of the fuel until the air/fuel ratio of the exhaust gas based on the combustion of the fuel injected in compliance with the injection instruction appears as the output value of the upstream-side air/fuel ratio sensor. In other words, the output value of the upstream-side air/fuel ratio sensor becomes a value representative of the air/fuel ratio of the exhaust gas which has been produced on the basis of the fuel injection instruction performed the delay time before.

Meanwhile, time periods concerning the stroke delay and transport delay mentioned above can be acquired on the basis of, for example, an injection timing, an ignition timing, the various dimensions of the engine, the engine revolution speed, the in-cylinder intake air quantity, the cross-sectional area of the exhaust passage, etc. Besides, a time period concerning the response delay can be acquired in such a way that the response characteristic of the upstream-side air/fuel ratio sensor is obtained through experiments etc. beforehand. Accordingly, the delay-time acquisition means can acquire the delay time ascribable to the stroke delay, transport delay and response delay.

For the above reason, when the apparatus is so configured that, in calculating the parameter value for correcting the command basic fuel injection quantity, the value which concerns the injection instruction at the time preceding the delay time is used as, at least, the command final fuel injection quantity, as described above (while the value at the current time is used as the output value of the upstream-side air/fuel ratio sensor), the time at which the fuel injection instruction that concerns the production of the exhaust gas having the air/fuel ratio represented by the output value of the upstream-side air/fuel ratio sensor at the current time has been given, and the time of the fuel injection instruction which is based on the command final fuel injection quantity that is used for the calculation of the parameter value for correcting the command basic fuel injection quantity, can agree. Accordingly, the parameter value can be more precisely calculated as the value for bringing the command basic fuel injection quantity into agreement with the target command basic fuel injection quantity.

In this case, the delay-time acquisition means should appropriately be configured so as to alter the delay time in accordance with the running state of the internal combustion engine. As stated above, the time periods concerning the stroke delay and transport delay change in accordance with, for example, the running state of the engine, such as the engine revolution speed or the in-cylinder intake air quantity. Accordingly, owing to the above configuration, the delay time can be precisely acquired irrespective of the running state of the internal combustion engine, and hence, the time at which the fuel injection instruction that concerns the production of the exhaust gas having the air/fuel ratio represented by the output value of the upstream-side air/fuel ratio sensor at the current time has been given, and the time of the fuel injection instruction which is based on the command final fuel injection quantity that is used for the calculation of the parameter value for correcting the command basic fuel injection quantity, and the command basic fuel injection quantity, agree more precisely. As a result, the parameter value can be more precisely calculated as the value for bringing the command basic fuel injection quantity into agreement with the target command basic fuel injection quantity.

Besides, in the air/fuel ratio control apparatus according to the invention, in the case where the command basic fuel injection quantity is corrected using the parameter value for correcting this command basic fuel injection quantity, storage means should appropriately be further comprised for storing the parameter value for correcting the command basic fuel injection quantity as calculated by the command basic-fuel-injection-quantity correction means.

In general, in a case where the engine is under the warming-up operation and where the upstream-side air/fuel ratio sensor is not sufficiently activated yet, a case where the upstream-side air/fuel ratio sensor develops trouble, and so forth (hereinbelow, generally termed the "case where the output value of the upstream-side air/fuel ratio sensor does not become a normal value"), the output value of the upstream-side air/fuel ratio sensor does not become a value which precisely represents the air/fuel ratio of the exhaust gas. In such a case, the parameter value for correcting the command basic fuel injection quantity as is computed using the output value of the upstream-side air/fuel sensor cannot be precisely computed, either. Accordingly, the parameter value which is computed in such a case ought not to be used for the correction of the command basic fuel injection quantity.

On the other hand, it can be considered that the error magnitude of the basic fuel injection quantity does not greatly change within a certain extent of period. For the above reason, when the apparatus is configured so as to further comprise the storage means for storing the parameter value for correcting the command basic fuel injection quantity, as described above, the parameter value for correcting the command basic fuel injection quantity as is computed using the output value of the upstream-side air/fuel ratio sensor in the case, for example, where the output value becomes the normal value, can be sequentially stored and updated in the storage means.

Then, even in the case where the output value of the upstream-side air/fuel ratio sensor does not become the normal value, the correction of the command basic fuel injection quantity is made using the parameter value previously stored in the storage means, whereby the command basic fuel injection quantity can be brought into agreement with the target command basic fuel injection quantity somewhat precisely.

BEST MODE FOR CARRYING OUT THE INVENTION

Now, the individual embodiments of an air/fuel ratio control apparatus for an internal combustion engine according to the present invention will be described with reference to the drawings.

First Embodiment

Figure 1:
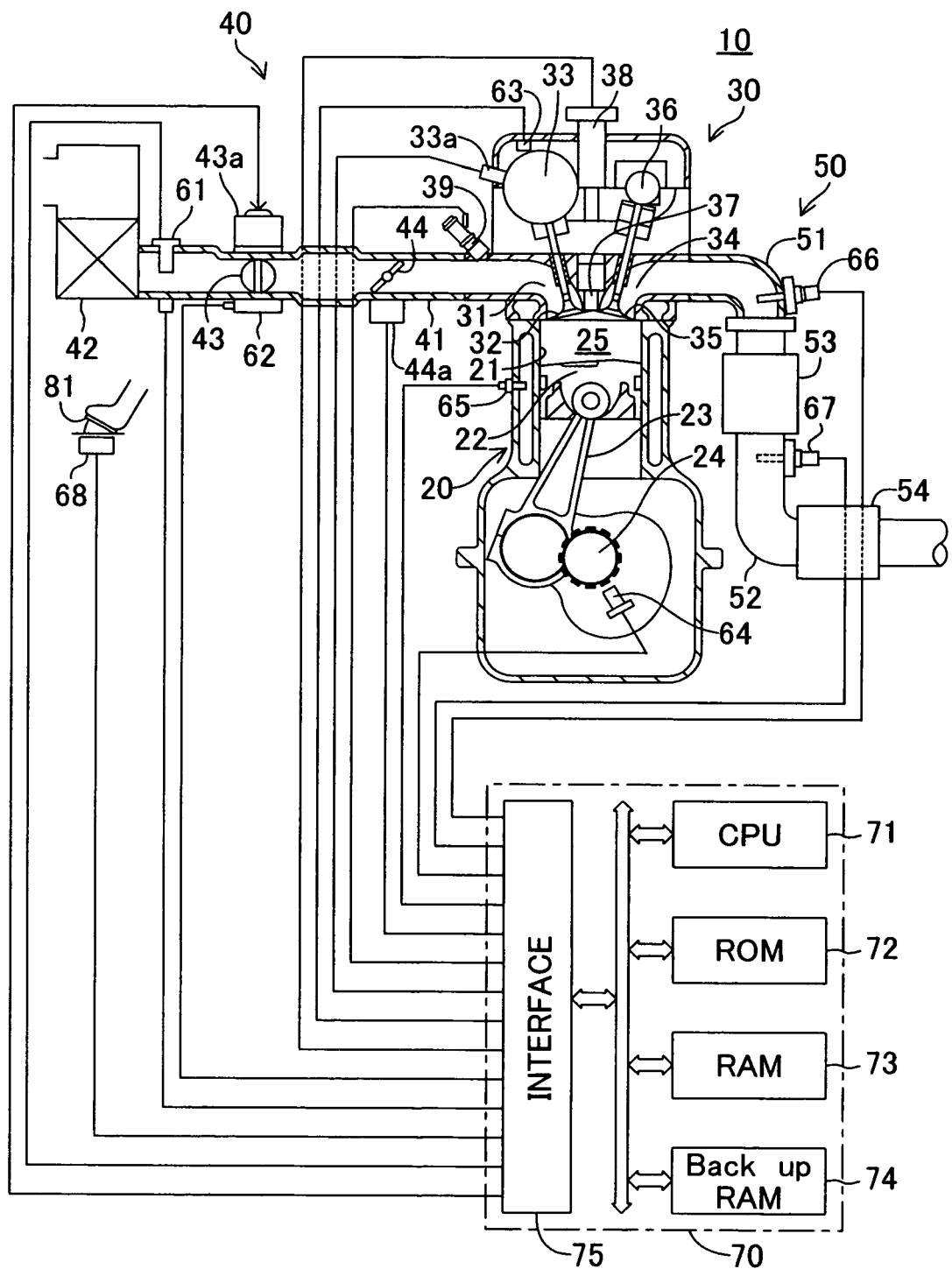
FIG. 1 is a schematic view of an internal combustion engine to which an air/fuel ratio control apparatus according to an embodiment of the present invention is applied.

FIG. 1 shows the schematic configuration of a system in which the air/fuel ratio control apparatus according to the first embodiment is applied to the spark ignition type multicylinder (four-cylinder) internal combustion engine 10. This internal combustion engine 10 includes a cylinder block section 20 which includes a cylinder block, a cylinder block lower-case, an oil pan, etc., a cylinder head section 30 which is fixed on the cylinder block section 20, an intake system 40 which serves to feed a gasoline mixture into the cylinder block section 20, and an exhaust system 50 which serves to emit exhaust gas from the cylinder block section 20 to the exterior.

The cylinder block section 20 includes a cylinder 21, a piston 22, a connecting rod 23 and a crankshaft 24. The piston 22 reciprocates within the cylinder 21, and the reciprocation of the piston 22 is transmitted to the crankshaft 24 through the connecting rod 23, whereby the crankshaft 24 is rotated. The cylinder 21 and the head of the piston 22 form a combustion chamber 25 together with the cylinder head section 30.

The cylinder head section 30 is provided with an intake port 31 which communicates with the combustion chamber 25, an intake valve 32 which opens and closes the intake port 31, a variable intake timing device 33 which includes an intake cam shaft for driving the intake valve 32 and which alters the phase angle of the intake cam shaft continuously, the actuator 33a of the variable intake timing device 33, an exhaust port 34 which communicates with the combustion chamber 25, an exhaust valve 35 which opens and closes the exhaust port 34, an exhaust cam shaft 36 which drives the exhaust valve 35, an ignition plug 37, an igniter 38 which includes an ignition coil for generating a high voltage to be applied to the ignition plug 37, and an injector (fuel injection means) 39 which injects fuel into the intake port 31.

The intake system 40 is provided with an intake pipe 41 which includes an intake manifold that communicates with the intake port 31 and that forms an intake passage together with this intake port 31, an air filter 42 which is disposed at an end part of the intake pipe 41, a throttle valve 43 which lies within the intake pipe 41 and which varies the open sectional area of the intake passage, a throttle valve actuator 43a which constitutes throttle valve drive means and which is configured of a DC motor, a swirl control valve (hereinbelow, termed "SCV") 44, and an SCV actuator 44a which is configured of a DC motor.

The exhaust system 50 is provided with an exhaust manifold 51 which communicates with the exhaust port 34, an exhaust pipe 52 which is connected to the exhaust manifold 51 (actually, an aggregate in which the individual exhaust manifolds 51 communicating with the respective exhaust ports 34 are collected together), a ternary catalyst of upstream side, 53, which is disposed (interposed) in the exhaust pipe 52 (also called "upstream-side catalyst converter" or "start catalytic converter", and termed the "first catalyst 53" below), and a ternary catalyst of downstream side, 54, which is disposed (interposed) in the exhaust pipe 52 lying in the downstream of the first catalyst 53 (also called "under-floor catalytic converter" because this catalyst is disposed under the floor of a vehicle, and termed the "second catalyst 54" below). The exhaust port 34, the exhaust manifold 51 and the exhaust pipe 52 constitute an exhaust passage.

On the other hand, this system is provided with a hot wire type air flowmeter 61, a throttle position sensor 62, a cam position sensor 63, a crank position sensor 64, a water temperature sensor 65, an air/fuel ratio sensor 66 which is disposed in the exhaust passage lying in the upstream of the first catalyst 53 (in this example, the aggregate in which the individual exhaust manifolds 51 are collected together) (hereinbelow, termed the "upstream-side air/fuel ratio sensor 66"), an air/fuel ratio sensor 67 which is disposed in the exhaust passage lying in the downstream of the first catalyst 53 and the upstream of the second catalyst 54 (hereinbelow, termed the "downstream-side air/fuel ratio sensor 67"), and an accelerator opening-degree sensor 68.

Figure 2:
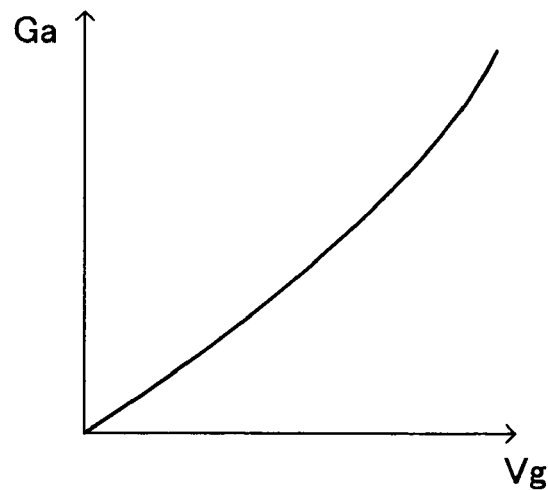
FIG. 2 is a graph showing the relationship between the output voltage of an air flowmeter shown in FIG. 1 and a measured intake-air flow rate.

The hot wire type air flowmeter 61 outputs a voltage Vg which corresponds to the mass flow rate per unit time, of intake air flowing within the intake pipe 41. The relationship between such an output Vg of the air flowmeter 61 and the measured intake air quantity (flow rate) Ga is as shown in FIG. 2. The throttle position sensor 62 detects the opening degree of the throttle valve 43 so as to output a signal which represents a throttle-valve opening degree TA. The cam position sensor 63 generates a signal (G2 signal) which has one pulse each time the intake cam shaft rotates 90° (that is, each time the crankshaft 24 rotates 180°). The crank position sensor 64 outputs a signal which has a pulse of narrow width each time the crankshaft 24 rotates 10°, and which has a pulse of broad width each time the crankshaft 24 rotates 360°. This signal represents an engine revolution speed NE. The water temperature sensor 65 detects the temperature of the cooling water of the internal combustion engine 10 so as to output a signal which represents a cooling water temperature THW.

Figure 3:
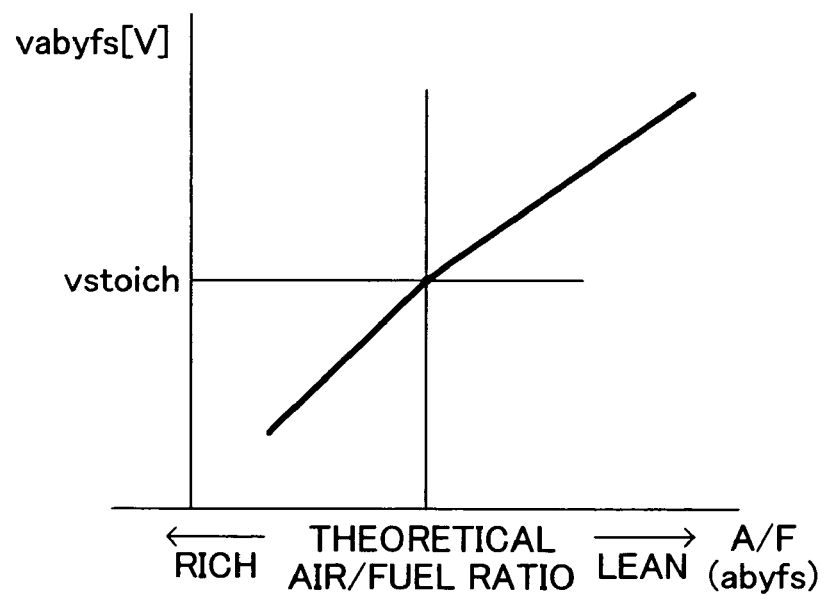
FIG. 3 is a graph showing the relationship between the output voltage of an upstream-side air/fuel ratio sensor shown in FIG. 1 and an air/fuel ratio.

The upstream-side air/fuel ratio sensor 66 is an oxygen concentration sensor of limit current type, which as shown in FIG. 3, outputs a current corresponding to an air/fuel ratio A/F and delivers an output value vabyfs which is a voltage corresponding to the current. Especially, when the air/fuel ratio is a theoretical air/fuel ratio, the output value vabyfs becomes an upstream-side target value vstoich. As seen from FIG. 3, according to the upstream-side air/fuel ratio sensor 66, the air/fuel ratios A/F over a wide range can be precisely detected.

Figure 4:
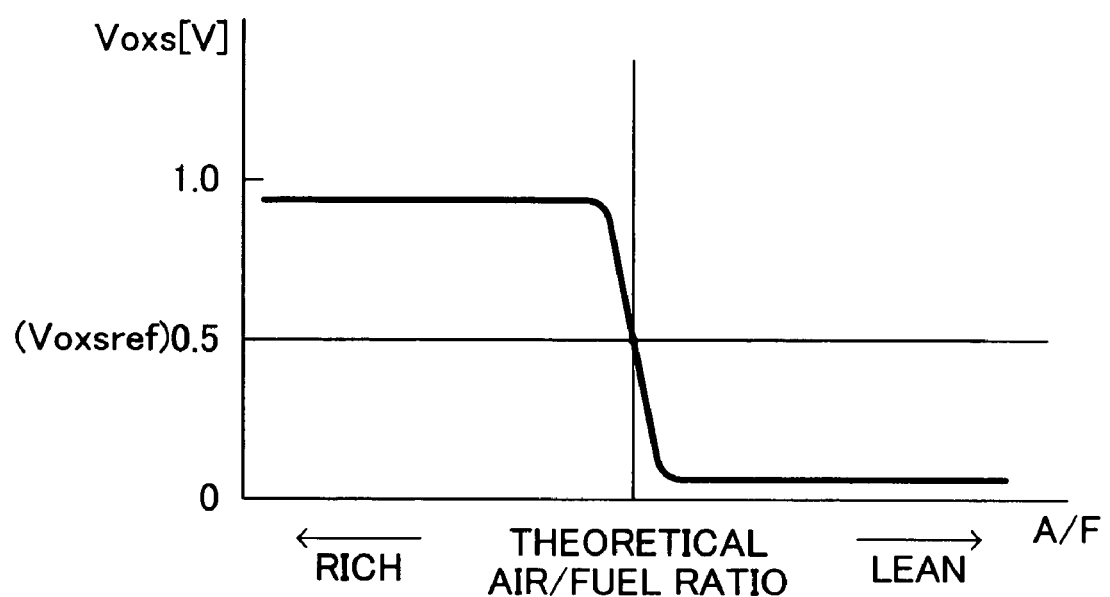
FIG. 4 is a graph showing the relationship between the output voltage of a downstream-side air/fuel ratio sensor shown in FIG. 1 and the air/fuel ratio.

The downstream-side air/fuel ratio sensor 67 is an oxygen concentration sensor of electromotive force type (concentration cell type), which as shown in FIG. 4, delivers an output value Voxs that is a voltage abruptly changing in the vicinity of the theoretical air/fuel ratio. Stated more concretely, the downstream-side air/fuel ratio sensor 67 outputs a voltage of about 0.1 (V) when the air/fuel ratio is leaner than the theoretical air/fuel ratio, it outputs a voltage of about 0.9 (V) when the air/fuel ratio is richer than the theoretical air/fuel ratio, and it outputs a voltage of 0.5 (V) when the air/fuel ratio is the theoretical air/fuel ratio. The accelerator opening-degree sensor 68 detects the manipulated variable of an accelerator pedal 81 which is manipulated by a driver, and it outputs a signal which represents the manipulated variable Accp of the accelerator pedal 81.

An electric control device 70 is a microcomputer which is constituted by a CPU 71, a ROM 72 in which routines (programs) to be executed by the CPU 71, tables (lookup tables and maps), constants, etc. are stored beforehand, a RAM 73 in which the CPU 71 temporarily stores data as may be needed, a backup RAM 74 in which data are stored in a state where a power supply is closed and which holds the stored data even while the power supply is cut off, an interface 75 which includes an A/D converter, and so forth, the constituents being interconnected by buses. The interface 75 is connected with the sensors 61-68 so as to feed the signals from the sensors 61-68 to the CPU 71, and it sends drive signals to the actuator 33a of the variable intake timing device 33, the igniter 38, the injector 39, the throttle valve actuator 43a and the SCV actuator 44a in compliance with the instructions of the CPU 71.

(Outline of Air/Fuel Ratio Feedback Control)

Next, there will be described the outline of the feedback control of the air/fuel ratio of the engine as is performed by the air/fuel ratio control apparatus configured as stated above.

When the air/fuel ratio of a gas flowing into the first catalyst 53 is the theoretical air/fuel ratio, the first catalyst 53 (the same holds true of the second catalyst 54) oxidizes HC and CO and reduces NOx, thereby to purify these harmful components at a high efficiency. Besides, the first catalyst 53 has the functions of occluding and releasing oxygen (oxygen occlusion function, or oxygen occlusion and release functions), and owing to the oxygen occlusion and release functions, it can purify HC, CO and NOx even when the air/fuel ratio has deviated to some extent from the theoretical air/fuel ratio. More specifically, when the air/fuel ratio of the mixture which is fed into the engine (hereinbelow, also termed the "air/fuel ratio of the engine") becomes lean until NOx is contained in a large quantity in the gas which flows into the first catalyst 53, this first catalyst 53 deprives the NOx of oxygen molecules so as to occlude the oxygen molecules and to reduce the NOx, thereby to purify the NOx. Besides, when the air/fuel ratio of the engine becomes rich until HC and CO are contained in large quantities in the gas which flows into the first catalyst 53, the ternary catalyst affords (releases) the occluded oxygen molecules to the HC and CO so as to oxidize them, thereby to purify the HC and CO.

Accordingly, the first catalyst 53 must keep oxygen in a large quantity in order that this first catalyst 53 may efficiently purify large quantities of HC and CO continuously flowing thereinto, whereas the first catalyst 53 must be in a state where it can sufficiently keep oxygen, in order to efficiently purify a large quantity of NOx continuously flowing thereinto. For the above reason, the purifying capability of the first catalyst 53 depends upon the maximum quantity of oxygen which this first catalyst 53 can keep (maximum oxygen occlusion quantity).

Meanwhile, the ternary catalyst such as first catalyst 53 deteriorates due to poisoning by lead, sulfur or the like contained in the fuel or to heat applied to this catalyst, and consequently, the maximum oxygen occlusion quantity lowers gradually. In order to continuously suppress an exhaust emission quantity even in the case where the maximum oxygen occlusion quantity has decreased in this manner, the air/fuel ratio of a gas which is exhausted from the first catalyst 53 (accordingly, the mean air/fuel ratio of the gas flowing into the first catalyst 53) needs to be controlled into a state where it is very close to the theoretical air/fuel ratio.

Therefore, the air/fuel ratio control apparatus of this embodiment controls the air/fuel ratio of the engine in accordance with the output value Voxs of the downstream-side air/fuel ratio sensor 67 (that is, the air/fuel ratio in the downstream of the first catalyst) so that the output value of the downstream-side air/fuel ratio sensor 67 may become a downstream-side target value Voxsref (0.5 (V)) which corresponds to the theoretical air/fuel ratio being a downstream-side target air/fuel ratio.

Figure 5:
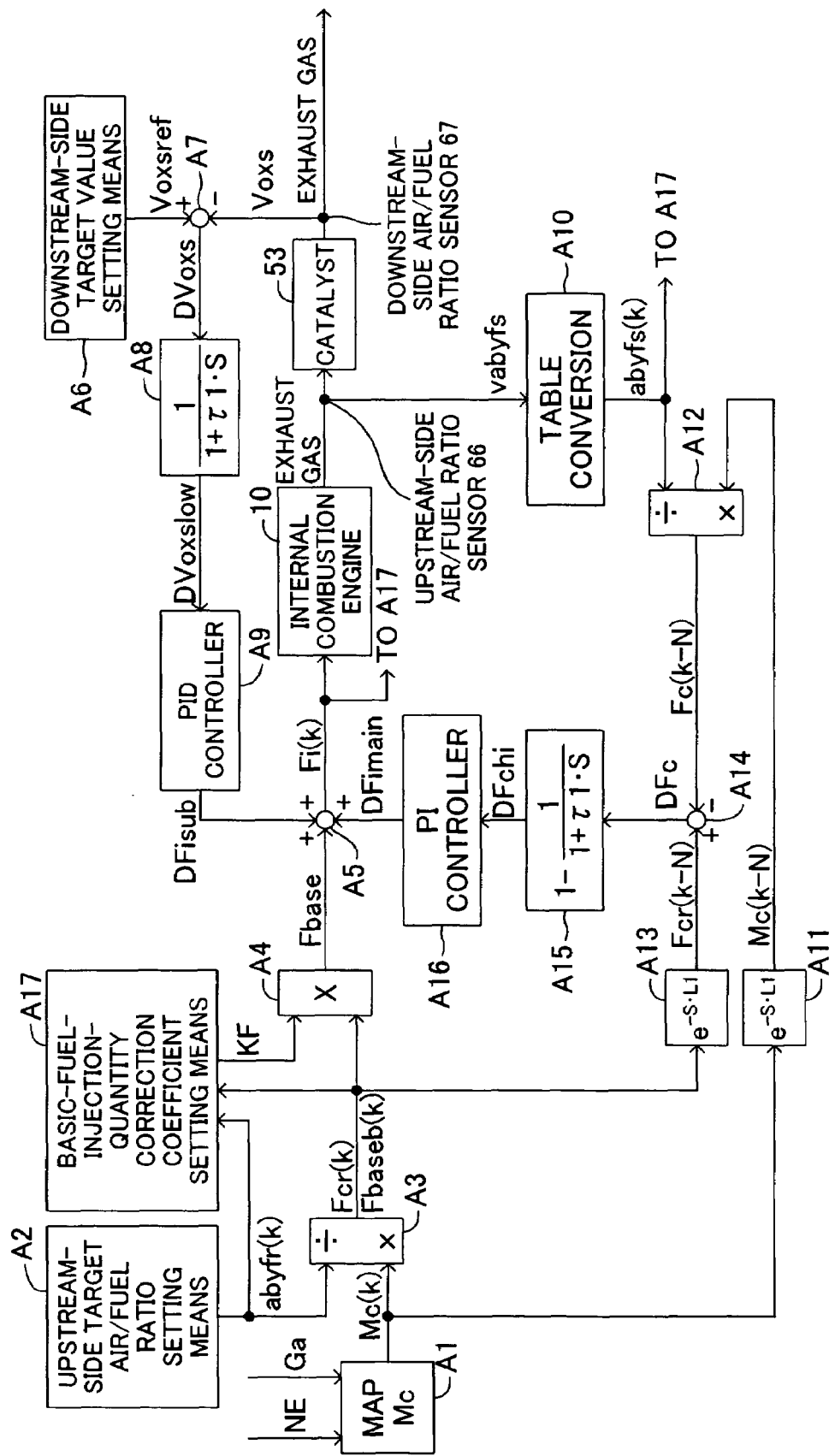
FIG. 5 is a functional block diagram in the case where the air/fuel ratio control apparatus shown in FIG. 1 executes an air/fuel ratio feedback control.

Stated more concretely, this air/fuel ratio control apparatus (hereinbelow, also termed the "present apparatus") is configured including individual means A1-A9 (parts of individual means A1-A17) as shown in FIG. 5 which is a functional block diagram. Now, the individual means will be described with reference to FIG. 5.

<Calculation of Corrected Command Basic Fuel Injection Quantity>

First, the in-cylinder intake air quantity calculation means A1 evaluates an in-cylinder intake air quantity Mc(k) which is the intake air quantity of the cylinder entering upon the current intake stroke, on the basis of the intake air flow rate Ga measured by the air flowmeter 61, the engine revolution speed NE obtained on the basis of the output of the crank position sensor 64, and the table MAPMc stored in the ROM 72. Here, the suffix "(k)" indicates that the quantity is a value for the current intake stroke (hereinbelow, the same holds true also of other physical quantities). Such in-cylinder intake air quantities Mc are successively stored in the RAM 73 while being associated with the intake strokes of the respective cylinders.

The upstream-side target air/fuel ratio setting means A2 determines an upstream-side target air/fuel ratio abyfr(k) corresponding to a predetermined upstream-side target value, on the basis of the engine revolution speed NE being the running state of the internal combustion engine 10, the throttle-valve opening degree TA, etc. The upstream-side target air/fuel ratio abyfr(k) is set at the theoretical air/fuel ratio after the end of the warming-up of the internal combustion engine 10 by way of example, except in a special case. Besides, such upstream-side target air/fuel ratios abyfr are successively stored in the RAM 73 while being associated with the intake strokes of the respective cylinders.

The uncorrected command basic fuel injection quantity calculation means A3 evaluates a target in-cylinder fuel feed quantity Fcr(k) for the current intake stroke (that is, an uncorrected command basic fuel injection quantity Fbaseb (k) at the current time), for turning the air/fuel ratio of the engine into the upstream-side target air/fuel ratio abyfr(k), in such a way that the in-cylinder intake air quantity Mc(k) evaluated by the in-cylinder intake air quantity calculation means A1 is divided by the upstream-side target air/fuel ratio abyfr(k) set by the upstream-side target air/fuel ratio setting means A2. Such target in-cylinder fuel feed quantities Fcr and such uncorrected command basic fuel injection quantities Fbaseb are successively stored in the RAM 73 while being associated with the intake strokes of the respective cylinders.

The corrected command basic fuel injection quantity calculation means A4 evaluates a corrected command basic fuel injection quantity Fbase in such a way that the uncorrected command basic fuel injection quantity Fbaseb(k) at the current time as has been evaluated by the uncorrected command basic fuel injection quantity calculation means A3 is multiplied by a basic-fuel-injection-quantity correction coefficient KF evaluated by the basic-fuel-injection-quantity correction coefficient setting means A17 to be stated later. The basic-fuel-injection-quantity correction coefficient setting means A17 will be detailed later.

In this manner, the present apparatus evaluates the corrected command basic fuel injection quantity Fbase by utilizing the in-cylinder intake air quantity calculation means A1, the upstream-side target air/fuel ratio setting means A2, the uncorrected command basic fuel injection quantity calculation means A3, the corrected command basic fuel injection quantity calculation means A4, and the basic-fuel-injection-quantity correction coefficient setting means A17. As will be stated later, the corrected command basic fuel injection quantity Fbase is a command fuel injection quantity which is to be given as an instruction to the injector 39 in order that the actual air/fuel ratio of the mixture to be fed into the engine may be turned into the target air/fuel ratio abyfr(k) at the current time.

<Calculation of Command Final Fuel Injection Quantity>

The command final-fuel-injection-quantity calculation means A5 evaluates a command final fuel injection quantity Fi(k) at the current time, on the basis of Formula (1) given below, in such a way that a main feedback correction magnitude DFimain and a sub-feedback correction magnitude DFisub to be stated later are added to the corrected command basic fuel injection quantity Fbase(k). Such command final fuel injection quantities Fbase are successively stored in the RAM 73 while being associated with the intake strokes of the respective cylinders.

$$Fi(k)=F\text{base}(k)+DFi\text{main}+DFi\text{sub} \quad (1)$$

In this way, the present apparatus gives the fuel injection instruction of the command final fuel injection quantity Fi(k), which is obtained in such a way that the corrected command basic fuel injection quantity Fbase(k) is corrected on the basis of the main feedback correction magnitude DFimain and the sub-feedback correction magnitude DFisub by the command final-fuel-injection-quantity calculation means A5, to the injector 39 of the cylinder entering upon the current intake stroke. As a result, the "error of the basic fuel injection quantity" stated before is contained in such a fuel quantity which is actually injected from the injector 39.

<Calculation of Sub-Feedback Correction Magnitude>

First, likewise to the upstream-side target air/fuel ratio setting means A2 described above, the downstream-side target value setting means A6 determines a downstream-side target value (predetermined downstream-side target value) Voxsref corresponding to a downstream-side target air/fuel ratio, on the basis of the engine revolution speed NE being the running state of the internal combustion engine 10, the throttle-valve opening degree TA, etc. The downstream-side target value Voxsref is set at 0.5 (V) which is a value corresponding to the theoretical air/fuel ratio, after the end of the warming-up of the internal combustion engine 10 by way of example, except in a special case (refer to FIG. 4). Besides, in this example, the downstream-side target value Voxsref is set so that the downstream-side target air/fuel ratio corresponding to this downstream-side target value Voxsref may always agree with the upstream-side target air/fuel ratio abyfr(k) stated before.

The output deviation magnitude calculation means A7 evaluates an output deviation magnitude DVoxs in such a way that, on the basis of Formula (2) given below, the output value Voxs of the downstream-side air/fuel ratio sensor 67 at the current time is subtracted from the downstream-side target value Voxsref at the current time set by the downstream-side target value setting means A6 (concretely, the injection instruction start time of the current Fi(k)).

$$DV\text{oxs}=V\text{oxsref}-V\text{oxs} \quad (2)$$

The low-pass filter A8 is a filter of first order as indicated below by Formula (3) which represents its characteristic by employing a Laplace operator "s". In the formula (3), "τ1" is a time constant. The low-pass filter A8 substantially inhibits the high frequency components of or above a frequency (1/τ1) from passing. This low-pass filter A8 receives the value of the output deviation magnitude DVoxs evaluated by the output deviation magnitude calculation means A7, and delivers a low-pass-filtered output deviation magnitude DVoxslow which is a value obtained after the value of the output deviation magnitude DVoxs has been subjected to low-pass filtering in accordance with the formula (3).

$$1/(1+\tau 1 \cdot s) \quad (3)$$

The PID controller A9 evaluates the sub-feedback correction magnitude DFisub on the basis of Formula (4) given below, in such a way that the low-pass-filtered output deviation magnitude DVoxslow being the output value of the low-pass filter A8 is subjected to a proportional, integral and differential process (PID process).

$$DF\text{isub}=Kp \cdot DV\text{oxslow}+Ki \cdot SDV\text{oxslow}+Kd \cdot DDV\text{oxslow} \quad (4)$$

In the above formula (4), "Kp" is a preset proportional gain (proportional constant), "Ki" is a preset integral gain (integral constant), and "Kd" is a preset differential gain (differential constant). Besides, "SDVoxslow" is the time integral value of the low-pass-filtered output deviation magnitude DVoxslow, and "DDVoxslow" is the time differential value of the low-pass-filtered output deviation magnitude DVoxslow.

In this way, the present apparatus corrects the corrected command basic fuel injection quantity Fbase(k) independently of the correction of this corrected command basic fuel injection quantity Fbase(k) as based on the main feedback control to be described later (as based on the main feedback correction magnitude DFimain), in such a way that the sub-feedback correction magnitude DFisub is evaluated on the basis of the output deviation magnitude DVoxs which is the deviation between the downstream-side target value Voxsref and the output value Voxs of the downstream-side air/fuel ratio sensor 67 (actually, the low-pass-filtered output deviation magnitude DVoxslow), and that the sub-feedback correction magnitude DFisub is added to the corrected command basic fuel injection quantity Fbase(k).

Regarding, for example, a value corresponding to an air/fuel ratio at which the output value Voxs of the downstream-side air/fuel ratio sensor 67 is leaner than the theoretical air/fuel ratio because the mean air/fuel ratio of the engine is lean, the output deviation magnitude DVoxs evaluated by the output deviation magnitude calculation means A7 becomes a plus value (refer to FIG. 4), and hence, the sub-feedback correction magnitude DFisub evaluated by the PID controller A9 becomes a plus value. Thus, the command final fuel injection quantity Fi(k) evaluated by the command final-fuel-injection quantity calculation means A5 becomes larger than the corrected command basic fuel injection quantity Fbase(k), so that the air/fuel ratio of the engine is controlled so as to become rich.

To the contrary, regarding a value corresponding to an air/fuel ratio at which the output value Voxs of the downstream-side air/fuel ratio sensor 67 is richer than the theoretical air/fuel ratio because the mean air/fuel ratio of the engine is rich, the output deviation magnitude DVoxs evaluated by the output deviation magnitude calculation means A7 becomes a minus value, and hence, the sub-feedback correction magnitude DFisub evaluated by the PID controller A9 becomes a minus value. Thus, the command final fuel injection quantity Fi(k) evaluated by the command final-fuel-injection quantity calculation means A5 becomes smaller than the corrected command basic fuel injection quantity Fbase(k), so that the air/fuel ratio of the engine is controlled so as to become lean.

Besides, since the PID controller A9 contains the integral term Ki·SDVoxslow, the output deviation magnitude DVoxs is guaranteed to become zero in a steady state. In other words, the steady-state deviation between the downstream-side target value Voxsref and the output value Voxs of the downstream-side air/fuel ratio sensor 67 becomes zero. Besides, in the steady state, both the proportional term Kp·DVoxslow and the differential term Kd·DDVoxslow become zero because the output deviation magnitude DVoxs becomes zero, so that the sub-feedback correction magnitude DFi becomes equal to the value of the integral term Ki·SDVoxslow. This value is a value which is based on the time integral value of the deviation between the output value Voxs of the downstream-side air/fuel ratio sensor 67 and the downstream-side target value Voxsref.

Such an integral process is executed in the PID controller A9, whereby the error of the basic fuel injection quantity as stated before can be compensated, and the air/fuel ratio in the downstream of the first catalyst 53 (accordingly, the air/fuel ratio of the engine) can converge to the downstream-side target air/fuel ratio corresponding to the downstream-side target value Voxsref (that is, the theoretical air/fuel ratio), in the steady state. In the above, the downstream-side target value setting means A6, the output deviation magnitude calculation means A7, the low-pass filter A8 and the PID controller A9 correspond to sub-feedback correction magnitude calculation means.

<Main Feedback Control>

As described before, the first catalyst 53 has the oxygen occlusion function. Accordingly, high frequency components of comparatively high frequencies (for example, of or above the frequency $(1/\tau 1)$) and low frequency components of comparatively low frequencies (for example, below the frequency $(1/\tau 1)$) and comparatively small amplitudes (magnitudes of deviations from the theoretical air/fuel ratio), in the fluctuations of the air/fuel ratio of the exhaust gas in the upstream of the first catalyst 53, are completely absorbed by the oxygen occlusion function which the first catalyst 53 has, whereby the components do not appear as the fluctuations of the air/fuel ratio of the exhaust gas in the downstream of the first catalyst 53. Accordingly, in a case, for example, where the internal combustion engine 10 is in a transient running state and where the air/fuel ratio of the exhaust gas fluctuates greatly at a high frequency of or above the frequency $(1/\tau 1)$, the fluctuation of the air/fuel ratio does not appear in the output value Voxs of the downstream-side air/fuel ratio sensor 67, and hence, the air/fuel ratio control for the fluctuation of the air/fuel ratio at or above the frequency $(1/\tau 1)$ (that is, compensation for the abrupt change of the air/fuel ratio in the transient running state) cannot be executed by the sub-feedback control. Therefore, for the purpose of reliably performing the compensation for the abrupt change of the air/fuel ratio in the transient running state, it is necessary to perform the main feedback control which is the air/fuel ratio control based on the output value vabyfs of the upstream-side air/fuel ratio sensor 66.

On the other hand, low frequency components of comparatively low frequencies (for example, below the frequency $(1/\tau 1)$) and comparatively large amplitudes in the fluctuations of the air/fuel ratio of the exhaust gas in the upstream of the first catalyst 53 are not completely absorbed by the oxygen occlusion function of the first catalyst 53, and they appear somewhat later as the fluctuations of the air/fuel ratio of the exhaust gas in the downstream of the first catalyst 53. As a result, there exists a case where the output value vabyfs of the upstream-side air/fuel ratio sensor 66 and the output value Voxs of the downstream-side air/fuel ratio sensor 67 become values which indicate air/fuel ratios deviating in directions opposite to each other relative to the theoretical air/fuel ratio. In this case, accordingly, when the air/fuel ratio control of the engine as based on the main feedback control (the main feedback correction magnitude DFimain to be stated later) and the air/fuel ratio control of the engine as based on the sub-feedback control (accordingly, the sub-feedback correction magnitude DFisub stated above) are simultaneously performed, the two air/fuel ratio controls interfere with each other, and hence, the favorable air/fuel ratio control of the engine cannot be performed.

For the above reason, the occurrence of the interference of the air/fuel ratio controls of the engine can be avoided, and the compensation for the abrupt change of the air/fuel ratio in the transient running state can be reliably performed, when the output value vabyfs of the upstream-side air/fuel ratio sensor 66 after low frequency components below a predetermined frequency (in this example, the frequency $(1/\tau 1)$) as are the extent of frequency components that can appear as the fluctuations of the air/fuel ratio in the downstream of the first catalyst 53 have been cut from within the frequency components in the fluctuations of the output value vabyfs of the upstream-side air/fuel ratio sensor 66, is used for the main feedback control.

Therefore, the present apparatus is configured including the individual means A10-A16 as shown in FIG. 5 referred to before. Now, the respective means will be described with reference to FIG. 5.

<Calculation of Main Feedback Correction Magnitude>

First, the table conversion means A10 evaluates a current detection air/fuel ratio abyfs(k) at the current time (concretely, the fuel instruction start time of the current quantity Fi(k)) as detected by the upstream-side air/fuel ratio sensor 66, on the basis of the output value vabyfs of the upstream-side air/fuel ratio sensor 66 and a table which prescribes the relationship between the upstream-side air/fuel ratio sensor output value vabyfs and the air/fuel ratio A/F as shown in FIG. 3 referred to before.

The in-cylinder intake air quantity delay means A11 reads out from the RAM 73 the in-cylinder intake air quantity Mc of the cylinder having entered upon the intake stroke preceding N strokes (N times of intake strokes) from the present time, among the in-cylinder intake air quantities Mc having been evaluated in the respective intake strokes by the in-cylinder intake air quantity calculation means A1 and stored in the RAM 73, and it sets the read-out in-cylinder intake air quantity Mc as an in-cylinder intake air quantity Mc(k−N).

The in-cylinder fuel feed quantity calculation means A12 evaluates an actual in-cylinder fuel feed quantity Fc(k−N) preceding the N strokes from the present time, in such a way that the in-cylinder intake air quantity Mc(k−N) preceding the N strokes from the present time as has been evaluated by the in-cylinder intake air quantity delay means A11 is divided by the current detection air/fuel ratio abyfs(k) evaluated by the table conversion means A10. Here, the value N is a value which differs depending upon the exhaust quantity of the internal combustion engine 10, a distance from the fuel chamber 25 to the upstream-side air/fuel ratio sensor 66, and so forth.

The reason why, in this manner, the in-cylinder intake air quantity Mc(k−N) preceding the N strokes is divided by the current detection air/fuel ratio abyfs(k) at the present time, in order to evaluate the actual in-cylinder fuel feed quantity Fc(k−N) preceding the N strokes from the present time, is that a time period L1 corresponding to the N strokes is required before the mixture combusted in the combustion chamber 25 arrives at the upstream-side air/fuel ratio sensor 66.

The target in-cylinder fuel feed quantity delay means A13 reads out from the RAM 73 a target in-cylinder fuel feed quantity Fcr preceding the N strokes from the present time, among the target in-cylinder fuel feed quantities Fcr having been evaluated in the intake strokes by the uncorrected command basic-fuel-injection-quantity calculation means A3 and stored in the RAM 73, and it sets the read-out quantity Fcr as a target in-cylinder fuel feed quantity Fcr (k−N).

The in-cylinder fuel feed quantity deviation calculation means A14 evaluates an in-cylinder fuel feed quantity deviation DFc in such a way that, on the basis of Formula (5) given below, the actual in-cylinder fuel feed quantity Fc(k−N) preceding the N strokes from the present time as has been evaluated by the in-cylinder fuel feed quantity calculation means A12 is subtracted from the target in-cylinder fuel feed quantity Fcr(k−N) preceding the N strokes from the present time as has been set by the target in-cylinder fuel feed quantity delay means A13. The in-cylinder fuel feed quantity deviation DFc is a quantity which represents the excess or deficiency of the fuel fed into the cylinder at the time preceding the N strokes, and it is a value which is based on the deviation between the output value vabyfs of the upstream-side air/fuel ratio sensor 66 and the upstream-side target value (vstoich shown in FIG. 3, when the upstream-side target air/fuel ratio abyfr is the theoretical air/fuel ratio).

$$DFc=Fcr(k-N)-Fc(k-N) \quad (5)$$

The high-pass filter A15 is a filter of first order as indicated below by Formula (6) which represents its characteristic by employing the Laplace operator "s". In the formula (6), "τ1" is the same time constant as the time constant τ1 of the low-pass filter A8. The high-pass filter A15 substantially inhibits the low frequency components of or below the frequency (1/τ1) from passing.

$$1-1/(1+\tau 1 \cdot s) \quad (6)$$

The high-pass filter A15 receives the value of the in-cylinder fuel feed quantity deviation DFc evaluated by the in-cylinder fuel feed quantity deviation calculation means A14, and delivers a high-pass-filtered in-cylinder fuel feed quantity deviation DFchi which is a value obtained after the value of the in-cylinder fuel feed quantity deviation DFc has been subjected to high-pass filtering in accordance with the formula (6). Accordingly, the high-pass-filtered in-cylinder fuel feed quantity deviation DFchi is a value obtained after the value which is based on the deviation between the output value vabyfs of the upstream-side air/fuel ratio sensor 66 and the upstream-side target value has been subjected to the high-pass filtering.

The PI controller A16 evaluates the main feedback correction magnitude DFimain for compensating (the excess or deficiency of only the high frequency components of or above the frequency (1/τ1), in) the excess or deficiency of the fuel feed quantity preceding the N strokes, on the basis of Formula (7) given below, in such a way that the high-pass-filtered in-cylinder fuel feed quantity deviation DFchi being the output value of the high-pass filter A15 is subjected to a proportional and integral process (PI process).

$$DFimain=(Gphi \cdot DFchi+Gihi \cdot SDFchi) \cdot KFB \quad (7)$$

In the above formula (7), "Gphi" is a preset proportional gain (proportional constant), and "Gihi" is a preset integral gain (integral constant). "SDFchi" is the time integral value of the high-pass-filtered in-cylinder fuel feed quantity deviation DFchi. Besides, a coefficient KFB should appropriately be made variable depending upon the engine revolution speed NE, the in-cylinder intake air quantity Mc, etc., but it is set at "1" in this example. Such a main feedback correction magnitude DFimain is used in evaluating the command final fuel injection quantity Fi(k) by the command final-fuel-injection-quantity calculation means A5 as stated before.

In this manner, the present apparatus has the main feedback control circuit and the sub-feedback control circuit connected in parallel with the internal combustion engine 10. In addition, the present apparatus evaluates the main feedback correction magnitude DFimain on the basis of the high-pass-filtered in-cylinder fuel feed quantity deviation DFchi which is the value obtained after the value based on the deviation between the upstream-side target value corresponding to the upstream-side target air/fuel ratio abyfr and the output value vabyfs of the upstream-side air/fuel ratio 66 has been subjected to the high-pass filtering, and it adds the main feedback correction magnitude DFimain to the corrected command basic fuel injection quantity Fbase, thereby to correct the corrected command basic fuel injection quantity Fbase independently of the correction of this corrected command basic fuel injection quantity Fbase as based on the sub-feedback control stated before (based on the sub-feedback correction magnitude DFisub).

By way of example, when the air/fuel ratio of the engine has abruptly changed to become lean, the current detection air/fuel ratio abyfs(k) to be evaluated by the table conversion means A10 is evaluated as a value which is leaner (a value which is larger) than the upstream-side target air/fuel ratio abyfr(k−N) preceding the N strokes from the present time as has been set by the upstream-side target air/fuel ratio setting means A2. Therefore, the actual in-cylinder fuel feed quantity Fc(k−N) evaluated by the in-cylinder fuel feed quantity calculation means A12 becomes a value which is smaller than the target in-cylinder fuel feed quantity Fcr(k−N) evaluated by the target in-cylinder fuel feed quantity delay means A13, and the in-cylinder fuel feed quantity deviation DFc is evaluated as a large plus value. Besides, the high frequency components of or above the frequency (1/τ1) exist in the signal indicative of the in-cylinder fuel feed quantity deviation DFc, on account of the abrupt change of the air/fuel ratio of the engine, so that also the high-pass-filtered in-cylinder fuel feed quantity deviation DFchi obtained after the signal has passed through the high-pass filter A15 becomes a large plus value. Accordingly, the main feedback correction magnitude DFimain becomes a large plus value. Thus, the command final fuel injection quantity Fi(k) which is evaluated by the command final-fuel-injection-quantity calculation means A5 becomes larger than the corrected command basic fuel injection quantity Fbase, and the air/fuel ratio of the engine is controlled so as to become rich.

To the contrary, when the air/fuel ratio of the engine has abruptly changed to become rich, the current detection air/fuel ratio abyfs(k) is evaluated as a value which is richer (a value which is smaller) than the upstream-side target air/fuel ratio abyfr(K−N) preceding the N strokes from the present time. Therefore, the actual in-cylinder fuel feed quantity Fc(k−N) becomes a value which is larger than the target in-cylinder fuel feed quantity Fcr(k−N), and the in-cylinder fuel feed quantity deviation DFc is evaluated as a minus value. Besides, the high frequency components of or above the frequency (1/τ1) exist in the signal indicative of the in-cylinder fuel feed quantity deviation DFc, on account of the abrupt change of the air/fuel ratio of the engine, so that also the high-pass-filtered in-cylinder fuel feed quantity deviation DFchi becomes a minus value. Accordingly, the main feedback correction magnitude DFimain becomes a minus value. Thus, the command final fuel injection quantity Fi(k) becomes smaller than the corrected command basic fuel injection quantity Fbase, and the air/fuel ratio of the engine is controlled so as to become lean. In the above, the command final-fuel-injection-quantity calculation means AS, the table conversion means A10, the in-cylinder intake air quantity delay means A11, the in-cylinder fuel feed quantity calculation means A12, the target in-cylinder fuel feed quantity delay means A13, the in-cylinder fuel feed quantity deviation calculation means A14, the high-pass filter A15 and the PI controller A16 correspond to parts of main feedback control means.

In this way, the substantial air/fuel ratio control for the extent of fluctuations of the air/fuel ratio at or below the frequency (1/τ1) that can appear as the fluctuations of the air/fuel ratio in the downstream of the first catalyst 53 can be reliably performed by the sub-feedback control, and the low frequency components of or below the frequency (1/τ1) cannot pass through the high-pass filter A15 and are not inputted to the PI controller A16, so that the occurrence of the interference of the air/fuel ratio controls of the engine as stated before is avoidable. Moreover, the high frequency components of or above the frequency (1/τ1) in the fluctuations of the air/fuel ratio of the engine (accordingly, the fluctuations of the output value vabyfs of the upstream-side air/fuel ratio sensor 66) pass through the high-pass filter A15, so that the compensation for the abrupt change of the air/fuel ratio in the transient running state can be performed rapidly and reliably by the main feedback control.

<Setting of Basic-Fuel-Injection-Quantity Correction Coefficient>

As described before, the integral process is executed in the PID controller A9, whereby the error of the basic fuel injection quantity as stated before can be compensated in the sub-feedback control. Since, however, the change of the air/fuel ratio of the engine appears as the change of the air/fuel ratio of the exhaust gas in the downstream of the first catalyst 53, somewhat later under the influence of the oxygen occlusion function of the first catalyst 53 as stated before, the error of the basic fuel injection quantity cannot be immediately compensated by only the sub-feedback control in a case where the error of the basic fuel injection quantity increases abruptly, resulting in the problem that the exhaust emission quantity increases temporarily on some occasions.

Accordingly, the control apparatus needs to be so configured that the error of the basic fuel injection quantity can be immediately compensated even in the main feedback control which is free from the influence of a delay ascribable to the oxygen occlusion function. Since, however, the high-pass filtering is a process which achieves a function equivalent to a differential process (D process), the integral process cannot, in effect, be executed in the main feedback control in which the value having passed through the high-pass filter A15 is used as the input value of the PI controller A16. Consequently, the error of the basic fuel injection quantity cannot be compensated in the main feedback control.

For the above reason, the error of the basic fuel injection quantity needs to be immediately compensated without resorting to the integral processes based on the main feedback control and the sub-feedback control. For this purpose, among the values which determine the command final fuel injection quantity Fi, the corrected command basic fuel injection quantity Fbase which is the value other than the main feedback correction magnitude DFimain and the sub-feedback correction magnitude DFisub needs to be corrected so as to agree with (approximate to) a fuel injection quantity which ought to be given as an injection instruction to the injector 39 of the cylinder to enter upon the intake stroke (hereinbelow, termed the "target command basic fuel injection quantity Fbaset"), in order that the actual air/fuel ratio of the mixture which is fed into the engine may be set at the target air/fuel ratio abyfr.

For that purpose, as understood from FIG. 5, the basic-fuel-injection-quantity correction coefficient KF needs to be set so that a value obtained by multiplying the current uncorrected command basic fuel injection quantity Fbaseb(k) by the basic-fuel-injection-quantity correction coefficient KF which is set by the basic-fuel-injection-quantity correction coefficient setting means A17 stated before may agree with (approach to) the target command basic fuel injection quantity Fbaset. Now, there will be described a method of setting such a basic-fuel-injection-quantity correction coefficient KF by the basic-fuel-injection-quantity correction coefficient setting means A17.

In general, under the assumption that the in-cylinder intake air quantities which are imbibed into the combustion chamber are constant, the product between the fuel injection quantity and the air/fuel ratio of the mixture which is fed into the engine (accordingly, the air/fuel ratio of the exhaust gas) becomes constant. Under such an assumption, accordingly, there is generally held the relationship that the product between the command final fuel injection quantity Fi and the detection air/fuel ratio abyfs based on the upstream-side air/fuel ratio sensor 66 is equal to the product between the target command basic fuel injection quantity Fbaset which is necessary for setting the actual air/fuel ratio of the mixture to be fed into the engine, at the current target air/fuel ratio abyfr(k), and the target air/fuel ratio abyfr(k). Accordingly, the target command basic fuel injection quantity Fbaset can be generally represented in accordance with Formula (8) given below.

$$Fbaset = (abyfs/abyfr(k)) \cdot Fi \quad (8)$$

Here, as stated above, the basic-fuel-injection-quantity correction coefficient KF is set so that the value obtained by multiplying the current uncorrected command basic fuel injection quantity Fbaseb(k) by the correction coefficient KF may become equal to the target command basic fuel injection quantity Fbaset which is evaluated in accordance with the above formula (8), and hence, the correction coefficient KF can be set in accordance with Formula (9) given below.

$$KF = Fbaset/Fbaseb(k) \quad (9)$$

Meanwhile, a delay time L2 which is represented as the sum of the above stroke delay, a transport delay and a response delay is required since the injection instruction of the fuel until the air/fuel ratio of the exhaust gas based on the combustion of the fuel injected by the injection instruction appears as the output value vabyfs of the upstream-side air/fuel ratio sensor 66. In other words, the detection air/fuel ratio abyfs based on the upstream-side air/fuel ratio sensor 66 becomes a value which represents the air/fuel ratio of the exhaust gas that has been produced on the basis of the fuel injection instruction given the delay time L2 before.

Accordingly, in the case where the target command basic fuel injection quantity Fbaset is computed in accordance with the above formula (8), it is favorable that, while the current detection air/fuel ratio abyfs(k) is used as the detection air/fuel ratio abyfs, a command final fuel injection quantity Fi(k−M) preceding M strokes from the present time, which is a command final fuel injection quantity according to the fuel injection instruction given the M strokes (M times of intake strokes) equivalent to the delay time L2 before the present time (concretely, the injection instruction start time of the current quantity Fi(k)), is used as the command final fuel injection quantity Fi.

Further, in the case where the engine is in the transient running state, the detection air/fuel ratio abyfs, command final fuel injection quantity Fi and uncorrected command basic fuel injection quantity Fbaseb can greatly fluctuate at high frequencies of or above a predetermined frequency, separately and independently. In such a case, the relationships indicated in the above formulas (8) and (9) might fail to be held. In order to cut influences ascribable to such fluctuations of the high frequencies, accordingly, individual values obtained after the value of the current detection air/fuel ratio abyfs(k), the value of the command final fuel injection quantity Fi(K−M) preceding the M strokes and the value of the current corrected command basic fuel injection quantity Fbaseb(k) have been respectively subjected to predetermined low-pass filtering operations should preferably be used for the computation of the above formula (8) or (9).

Besides, time periods involved in the stroke delay and the transport delay tend to shorten in accordance with the rise of the engine revolution speed NE, and the time period involved in the transport delay tends to shorten in accordance with the increase of the in-cylinder intake air quantity Mc. Accordingly, the delay time L2 (accordingly, the value M) can be evaluated on the basis of, for example, the engine revolution speed NE, the in-cylinder intake air quantity Mc(k), and a table MapM which prescribes the relationship between the engine revolution speed NE as well as the in-cylinder intake air quantity Mc and the number of strokes M as graphically shown in FIG. 6.

Figure 7:
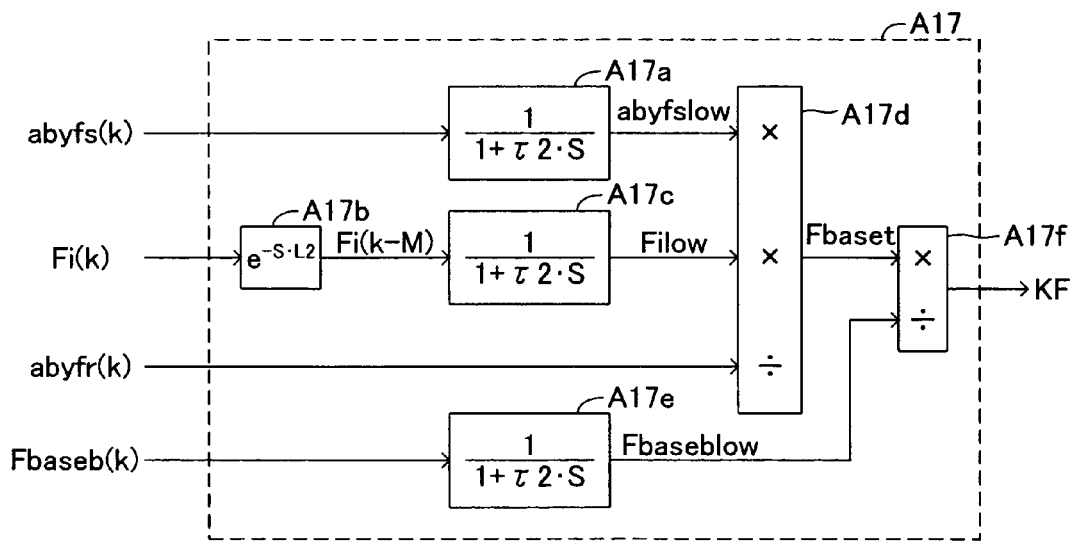
FIG. 7 is a functional block diagram in the case where basic-fuel-injection-quantity correction coefficient setting means shown in FIG. 5 sets a basic-fuel-injection-quantity correction coefficient.

For the above reason, the basic-fuel-injection-quantity correction coefficient setting means A17 is configured including individual means A17a-A17f as shown in FIG. 7 which is the functional block diagram thereof. The low-pass filter A17a is a filter of first order as indicated below by Formula (10) which represents its characteristic by employing the Laplace operator "s". In the formula (10), "τ2" is a time constant. The low-pass filter A17a substantially inhibits high frequency components of or below a frequency (1/τ2) from passing.

$$1/(1+\tau 2 \cdot s) \quad (10)$$

The low-pass filter A17a receives the value of the current detection air/fuel ratio abyfs(k) evaluated by the table conversion means A10, and delivers a low-pass-filtered detection air/fuel ratio abyfslow which is a value obtained after the value of the current detection air/fuel ratio abyfs(k) has been subjected to low-pass filtering in accordance with the above formula (10).

The command final-fuel-injection-quantity delay means A17b evaluates the value M on the basis of the above table MapM stored in the ROM 72, the engine revolution speed NE at the present time, and the current in-cylinder intake air quantity Mc(k). In addition, the command final-fuel-injection-quantity delay means A17b reads out from the RAM 73 the value of the cylinder which has entered upon the intake stroke preceding the M strokes (M times of intake strokes) from the present time, among the command final fuel injection quantities Fi which have been evaluated in the respective intake strokes by the command final-fuel-injection-quantity calculation means A5 and which are stored in the RAM 73, and it sets the read-out value as the command final fuel injection quantity Fi(k−M).

The low-pass filter A17c is the same filter as the low-pass filter A17a stated above, and it receives the value of the command final fuel injection quantity Fi(k−M) evaluated by the command final-fuel-injection-quantity delay means A17b and delivers a low-pass-filtered command final fuel injection quantity Filow which is a value obtained after the value of the command final fuel injection quantity Fi(k−M) has been subjected to low-pass filtering in accordance with the above formula (10).

The target command basic-fuel-injection-quantity calculation means A17d evaluates the target command basic fuel injection quantity Fbaset in such a way that the value of the low-pass-filtered detection air/fuel ratio abyfslow being the output of the low-pass filter A17a is divided by the current target air/fuel ratio abyfr(k) in accordance with Formula (11) given below as corresponds to the above formula (8), and that a value thus obtained is multiplied by the value of the low-pass-filtered command final fuel injection quantity Filow being the output of the low-pass filter A17c.

$$Fbaset = (abyfslow/abyfr(k)) \cdot Filow \quad (11)$$

The low-pass filter A17e is the same filter as the above low-pass filter A17a, and it receives the value of the current uncorrected command basic fuel injection quantity Fbaseb (k) evaluated by the uncorrected command basic-fuel-injection-quantity calculation means A3 and delivers a low-pass-filtered uncorrected command basic fuel injection quantity Fbaseblow which is a value obtained after the value of the current uncorrected command basic fuel injection quantity Fbaseb(k) has been subjected to low-pass filtering in accordance with the above formula (10).

The basic-fuel-injection-quantity correction coefficient setting means A17f evaluates the basic-fuel-injection-quantity correction coefficient KF in such a way that the target command basic fuel injection quantity Fbaset which has been evaluated by the target command basic-fuel-injection-quantity calculation means A17d is divided by the low-pass-filtered uncorrected command basic fuel injection quantity Fbaseblow being the output of the low-pass filter A17e, in accordance with Formula (12) given below as corresponds to the above formula (9).

$$KF = Fbaset/Fbaseblow \quad (12)$$

As described above, the basic-fuel-injection-quantity correction coefficient setting means A17 sets the basic-fuel-injection-quantity correction coefficient KF by utilizing the means A17a-A17f, every arrival at the injection time of the fuel (more concretely, the time at which the injection instruction is started). In addition, the present apparatus successively corrects the uncorrected command basic fuel injection quantity Fbaseb at the next time, in such a way that the next uncorrected command basic fuel injection quantity Fbaseb is multiplied by the basic-fuel-injection-quantity correction coefficient KF thus set at the current time (that is, it successively determines the corrected command basic fuel injection quantity Fbase at the next time). Accordingly, the next corrected command basic fuel injection quantity Fbase is successively determined so as to agree with (approach to) the fuel injection quantity which ought to be given as an injection instruction in order that the actual air/fuel ratio of the mixture which is fed into the engine may be set at the target air/fuel ratio abyfr. As a result, the error of the basic fuel injection quantity is rapidly compensated in succession while the air/fuel ratio of the mixture which is fed into the engine is being controlled toward the target air/fuel ratio abyfr.

<Storage Process for Basic-Fuel-Injection-Quantity Correction Coefficient>

As described before, during the warming-up operation of the engine, and in a case where the upstream-side air/fuel ratio sensor has developed trouble, or in the like case, that is, in a "case where the output value vabyfs of the upstream-side air/fuel ratio sensor 66 does not become a normal value", the detection air/fuel ratio abyfs does not become a value which precisely represents the air/fuel ratio of the exhaust gas. In such a case, the value of the basic-fuel-injection-quantity correction coefficient KF which is calculated in accordance with the above formula (11) (and the above formula (12)) by using the value of the low-pass-filtered detection air/fuel ratio abyfslow based on the detection air/fuel ratio abyfs does not become a value for precisely correcting the uncorrected command basic fuel injection quantity Fbaseb(k) into the target command basic fuel injection quantity Fbaset, either. In such a case, accordingly, the basic-fuel-injection-quantity correction coefficient KF which is calculated in accordance with the above formula (11) and formula (12) should not be used for the correction of the uncorrected command basic fuel injection quantity Fbaseb(k).

Therefore, only in a "case where the output value vabyfs of the upstream-side air/fuel ratio sensor 66 becomes the normal value (concretely, where a main feedback condition to be stated later holds true)", the present apparatus successively corrects the uncorrected command basic fuel injection quantity Fbaseb(k) by using the basic-fuel-injection-quantity correction coefficient KF computed in accordance with the above formula (11) and formula (12), and it sequentially stores the value of the computed basic-fuel-injection-quantity correction coefficient KF in the backup RAM 74 so as to be updated.

Figure 8:
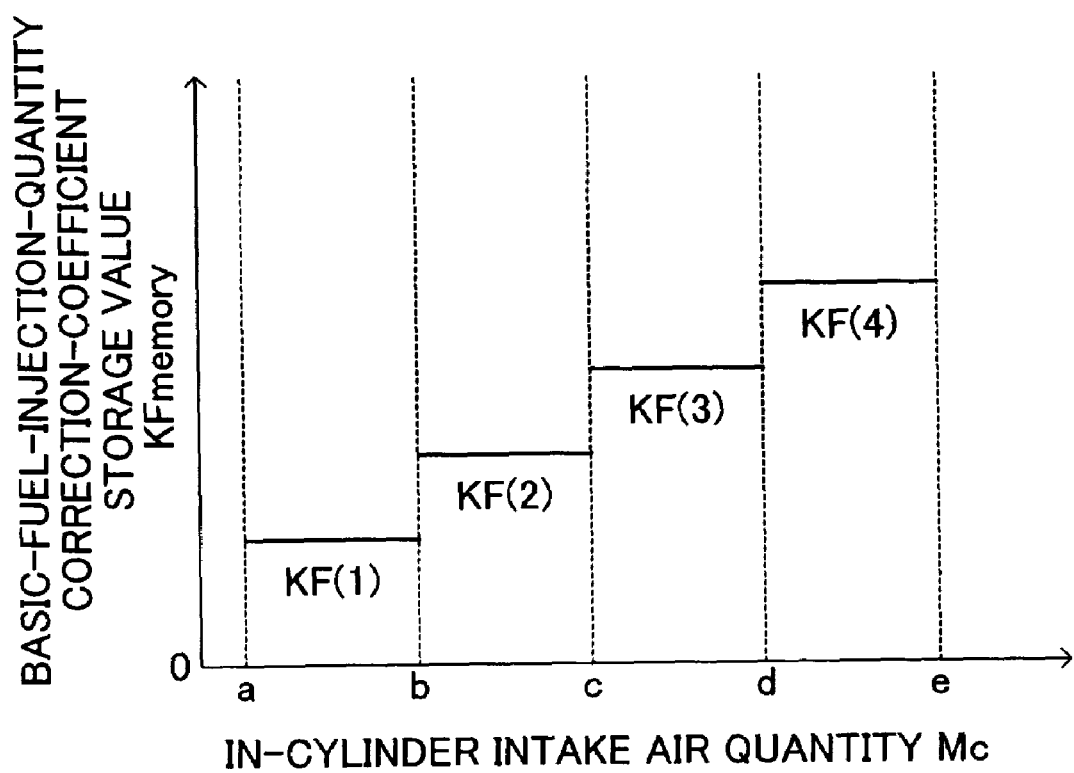
FIG. 8 is a diagram showing a situation where a computed basic-fuel-injection-quantity correction coefficient is classified in correspondence with the in-cylinder intake air quantity so as to be stored in the memory of a backup RAM.

In this case, by utilizing the fact that the error magnitude of the basic fuel injection quantity tends to enlarge in correspondence with the in-cylinder intake air quantity Mc (accordingly, the value of the basic-fuel-injection-quantity correction coefficient KF enlarges in correspondence with the in-cylinder intake air quantity Mc), the present apparatus divides a range which the in-cylinder intake air quantity Mc can assume, into a plurality of (in this example, four) classes as shown in FIG. 8. In addition, each time the present apparatus computes a new basic-fuel-injection-quantity correction coefficient KF, it selects the class to which the in-cylinder intake air quantity Mc(k) at the current time belongs, and it updates the value of the basic-fuel-injection-quantity correction coefficient KF(m) (m: 1, 2, 3 or 4) corresponding to the selected class, into the value of the new computed basic-fuel-injection-quantity correction coefficient KF, so as to successively store the updated value.

On the other hand, in the "case where the output value vabyfs of the upstream-side air/fuel ratio sensor 66 does not become the normal value (concretely, where the main feedback condition to be stated later does not hold true)", the present apparatus selects the class to which the current in-cylinder intake air quantity Mc(k) belongs, and it sets a value corresponding to the selected class, among the basic-fuel-injection-quantity correction coefficients KF(m) (m: 1, 2, 3 and 4) stored in the backup RAM 74, as a basic-fuel-injection-quantity correction-coefficient storage value KFmomery.

In addition, the present apparatus successively corrects the uncorrected command basic fuel injection quantity Fbaseb(k) by using the basic-fuel-injection-quantity correction-coefficient storage value KFmomery instead of the basic-fuel-injection-quantity correction coefficient KF computed in accordance with the above formula (11) and formula (12). Thus, even in the "case where the output value vabyfs of the upstream-side air/fuel ratio sensor 66 does not become the normal value", the uncorrected command basic fuel injection quantity Fbaseb(k) can be successively brought into agreement with the target command basic fuel injection quantity Fbaset somewhat precisely, with the result that the error of the basic fuel injection quantity can be successively compensated to some extent. The above is the outline of the air/fuel ratio feedback control for the engine as based on the present apparatus.

(Actual Operations)

Next, the actual operations of the air/fuel ratio control apparatus will be described.

<Air/Fuel Ratio Feedback Control>

Figure 9:
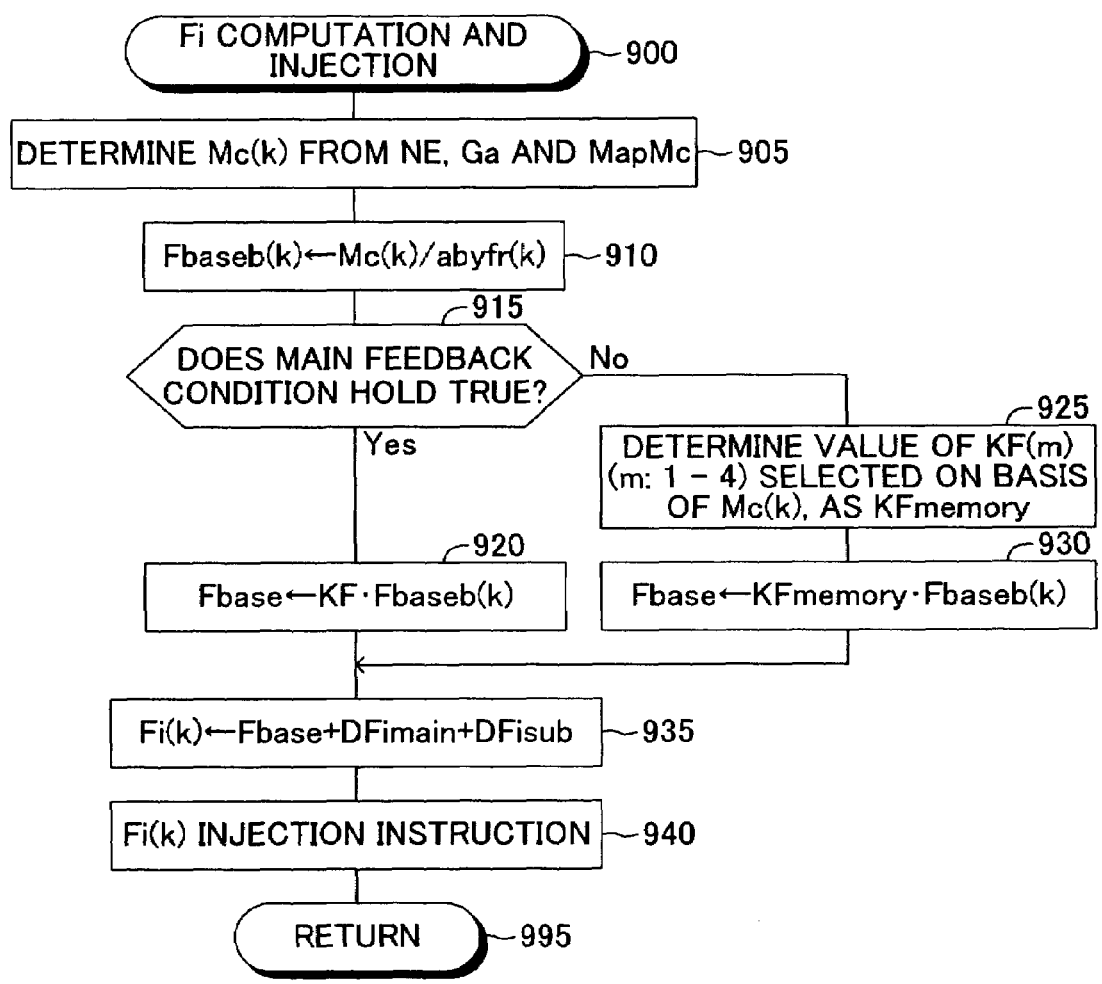
FIG. 9 is a flow chart showing a routine for computing a command final fuel injection quantity and giving an injection instruction as is executed by the CPU shown in FIG. 1.

The CPU 71 iteratively executes a routine for computing the fuel injection quantity Fi and giving the instruction of fuel injection as shown by a flow chart in FIG. 9, each time the crank angle of each of the cylinders becomes a predetermined crank angle before an intake top dead center (for example, BTDC 90° CA). Accordingly, when the crank angle of any of the cylinders becomes the predetermined crank angle, the CPU 71 starts processing from a step 900 and proceeds to a step 905, at which it estimates and determines the current in-cylinder intake air quantity Mc(k) imbibed into the cylinder that enters upon the current intake stroke (hereinbelow, also termed the "fuel injection cylinder"), on the basis of the intake air flow rate Ga measured by the air flowmeter 61, the engine revolution speed NE, and the table MapMc stated before.

Subsequently, the CPU 71 proceeds to a step 910, at which it determines a value obtained by dividing the estimated in-cylinder intake air quantity Mc(k) by the current target air/fuel ratio abyfr(k), as the current uncorrected command basic fuel injection quantity Fbaseb(k). Subsequently, the CPU 71 proceeds to a step 915, at which it decides whether or not the main feedback condition holds true. Here, the main feedback condition holds true when, for example, the cooling water temperature THW of the engine is a first predetermined temperature or above, the upstream-side air/fuel ratio sensor 66 is normal (including, in an active state), and the intake air quantity (load) of the engine per revolution is a predetermined value or below. That is, the fact that the main feedback condition holds true corresponds to the "case where the output value vabyfs of the upstream-side air/fuel ratio sensor 66 becomes the normal value" as stated before.

In a case where the main feedback condition holds true, the CPU 71 renders the decision as "Yes" at the step 915 and proceeds to a step 920, at which a value obtained by multiplying the uncorrected command basic fuel injection quantity Fbaseb(k) by the newest basic-fuel-injection-quantity correction coefficient KF that has been evaluated by a routine to be stated later (at the last fuel injection time) is set as the corrected command basic fuel injection quantity Fbase.

On the other hand, in a case where the main feedback condition does not hold true, the CPU 71 renders the decision as "No" at the step 915 and proceeds to a step 925, at which the value of the in-cylinder intake air quantity KF(m) that is selected on the basis of the value of the in-cylinder intake air quantity Mc(k) determined at the foregoing step 905, among the basic-fuel-injection-quantity correction coefficients KF(m) (m: 1, 2, 3 and 4) stored in the backup RAM 74, is set as the basic-fuel-injection-quantity correction-coefficient storage value KFmomery. Subsequently, the CPU 71 proceeds to a step 930, at which a value obtained by multiplying the uncorrected command basic fuel injection quantity Fbaseb(k) by the basic-fuel-injection-quantity correction-coefficient storage value KFmomey set at the step 925 is set as the corrected command basic fuel injection quantity Fbase.

Next, the CPU 71 proceeds to a step 935, at which a value obtained by adding the newest main feedback correction magnitude DFimain that has been evaluated by a routine to be stated later (at the last fuel injection time), and the newest sub-feedback correction magnitude DFisub that has been evaluated by a routine to be stated later (at the last fuel injection time), to the corrected command basic fuel injection quantity Fbase evaluated above, is evaluated as the command final fuel injection quantity Fi(k) at the current time in accordance with the above formula (1).

In addition, the CPU 71 proceeds to a step 940, at which it gives the injection instruction of the fuel of the command final fuel injection quantity Fi(k). Concretely, when a fuel injection start timing which is separately computed by a routine not shown has arrived, the CPU 71 instructs the injector 39 of the fuel injection cylinder to open the valve thereof for a time period corresponding to the command final fuel injection quantity Fi(k), whereby the fuel is injected. Besides, the CPU 71 proceeds to a step 995, at which it ends this routine once.

In the above way, the uncorrected command basic fuel injection quantity Fbaseb(k) is corrected so as to agree with the target command basic fuel injection quantity Fbaset stated before, and the fuel of the injection instruction of the command final fuel injection quantity Fi(k) obtained after the uncorrected command basic fuel injection quantity Fbaseb(k) subjected to the correction (that is, the corrected command basic fuel injection quantity Fbase) has been subjected to the main feedback correction and the sub-feedback correction is injected into the fuel injection cylinder.

(Computation of Main Feedback Correction Magnitude)

Next, there will be described the operation in the case of calculating the main feedback correction magnitude DFimain in the main feedback control. The CPU 71 iteratively executes a routine shown by a flow chart in FIG. 10, each time a fuel injection start timing (injection instruction start time) arrives for the fuel injection cylinder. Accordingly, when the fuel injection start timing arrives for the fuel injection cylinder, the CPU 71 starts processing from a step 1000 and proceeds to a step 1005, at which it decides whether or not the main feedback condition holds true. This main feedback condition is the same as the main feedback condition at the step 915 stated before.

Now, the description will be continued assuming that the main feedback condition holds true. The CPU 71 renders the decision as "Yes" at the step 1005 and proceeds to a step 1010, at which the output value vabyfs of the upstream-side air/fuel ratio sensor 66 at the present time (that is, the injection instruction start time) is converted on the basis of the table shown in FIG. 3, thereby to evaluate the detection air/fuel ratio abyfs(k) at the current time.

Next, the CPU 71 proceeds to a step 1015, at which the actual in-cylinder fuel feed quantity Fc(k−N) preceding N strokes (N times of intake strokes) from the present time is evaluated in such a way that the in-cylinder intake air quantity Mc(k−N) being the intake air quantity of the cylinder that has entered upon the intake stroke the N strokes before the present time is divided by the detection air/fuel ratio abyfs(k) evaluated above.

Subsequently, the CPU 71 proceeds to a step 1020, at which the target in-cylinder fuel feed quantity Fcr(k−N) preceding the N strokes from the present time is evaluated in such a way that the in-cylinder intake air quantity Mc(k−N) preceding the N strokes from the present time is divided by the target air/fuel ratio abyfr(k−N) preceding the N strokes from the present time.

In addition, the CPU 71 proceeds to a step 1025, at which a value obtained by subtracting the in-cylinder fuel feed quantity Fc(k−N) from the target in-cylinder fuel feed quantity Fcr(k−N) is set as the in-cylinder fuel feed quantity deviation DFc in accordance with the above formula (5). That is, the in-cylinder fuel feed quantity deviation DFc becomes a magnitude which represents the excess or deficiency of the fuel fed into the cylinder at the time preceding the N strokes. Next, the CPU 71 proceeds to a step 1030, at which the high-pass-filtered in-cylinder fuel feed quantity deviation DFchi is acquired in such a way that the in-cylinder fuel feed quantity deviation DFc is subjected to high-pass filtering by the high-pass filter A15.

Subsequently, the CPU 71 proceeds to a step 1035, at which the main feedback correction magnitude DFimain is evaluated in accordance with a formula indicated at the step 1035 as is based on the above formula (7). At the subsequent step 1040, the high-pass-filtered in-cylinder fuel feed quantity deviation DFchi evaluated at the step 1030 is added to the integral value SDFchi of the high-pass-filtered in-cylinder fuel feed quantity deviation DFchi at that time, thereby to evaluate the new integral value SDFchi of the high-pass-filtered in-cylinder fuel feed quantity deviation. Thereafter, the CPU 71 proceeds to a step 1095 and ends this routine once.

In the above way, the main feedback correction magnitude DFimain is evaluated, and this main feedback correction magnitude DFimain is reflected upon the command final fuel injection quantity Fi(k) by the step 935 in FIG. 9 as stated before, whereby the air/fuel ratio control of the engine as based on the foregoing main feedback control is performed.

On the other hand, when the main feedback condition does not hold true on the occasion of the decision of the step 1005, the CPU 71 renders the decision as "No" at the step 1005 and proceeds to a step 1045, at which the value of the main feedback correction magnitude DFimain is set at "0".

Thereafter, the CPU 71 proceeds to the step 1095 and ends this routine once. In this manner, when the main feedback condition does not hold true, the main feedback correction magnitude DFimain is set at "0", and the correction of the air/fuel ratio of the engine as based on the main feedback control is not made.

(Computation of Sub-Feedback Correction Magnitude)

Figure 11:
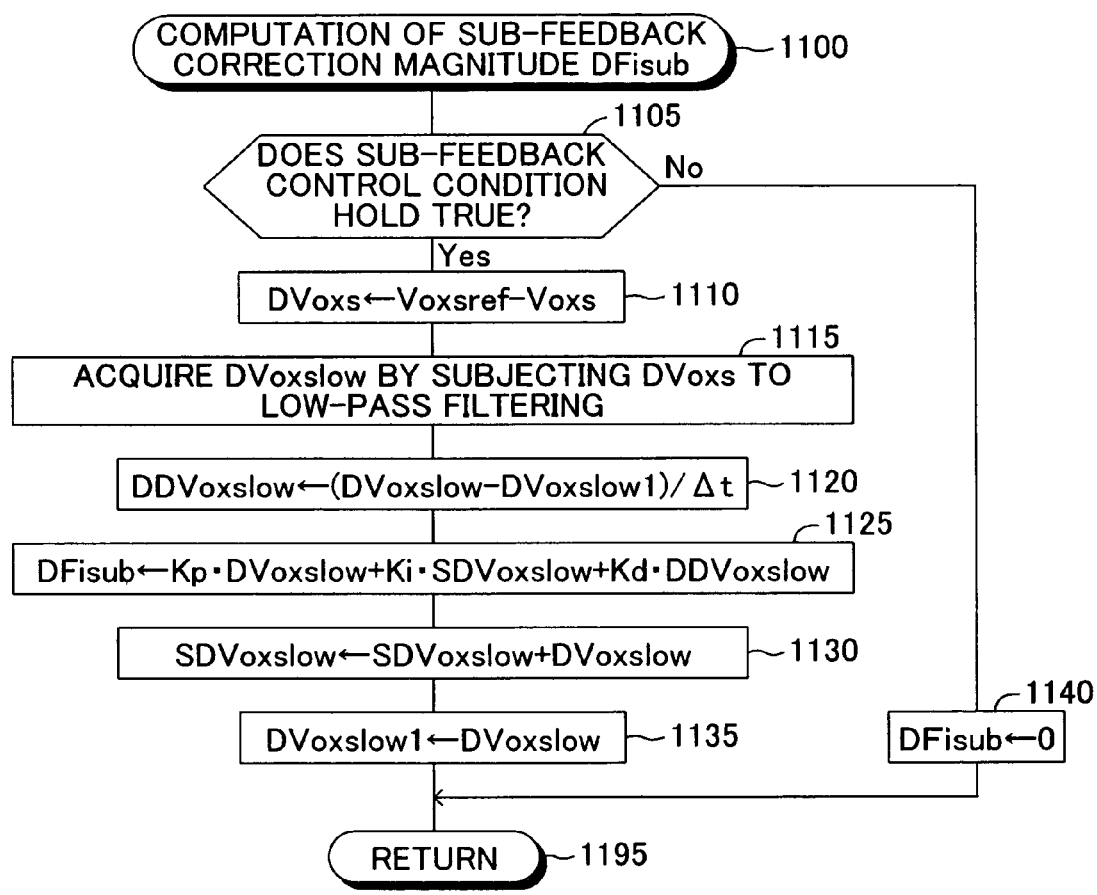
FIG. 11 is a flow chart showing a routine for computing a sub-feedback correction magnitude as is executed by the CPU shown in FIG. 1.

Next, there will be described the operation in the case of calculating the sub-feedback correction magnitude DFisub in the sub-feedback control. The CPU 71 iteratively executes a routine shown by a flow chart in FIG. 11, each time a fuel injection start timing (injection instruction start time) arrives for the fuel injection cylinder. Accordingly, when the fuel injection start timing arrives for the fuel injection cylinder, the CPU 71 starts processing from a step 1100 and proceeds to a step 1105, at which it decides whether or not a sub-feedback control condition holds true. The sub-feedback control condition holds true when, for example, the cooling water temperature THW of the engine is at or above a second predetermined temperature higher than the first predetermined temperature, in addition to the fulfillment of the main feedback condition at the step 915 (and the step 1005) stated before.

Now, the description will be continued assuming that the sub-feedback control condition holds true. The CPU 71 renders the decision as "Yes" at the step 1105 and proceeds to a step 1110, at which the output value Voxs of the downstream-side air/fuel ratio sensor 67 at the present time is subtracted from the downstream-side target value Voxsref in accordance with the above formula (2), thereby to evaluate the output deviation magnitude DVoxs.

Next, the CPU 71 proceeds to a step 1115, at which the low-pass-filtered output deviation magnitude DVoxslow is acquired in such a way that the output deviation magnitude DVoxs is subjected to low-pass filtering by the low-pass filter A8. At the subsequent step 1120, the differential value DDVoxslow of the low-pass-filtered output deviation magnitude DVoxslow is evaluated on the basis of Formula (13) given below.

$$DDVoxslow = (DVoxslow - DVoxslow1)/\Delta t \qquad (13)$$

In the above formula (13), "DVoxslow1" is the last value of the low-pass-filtered output deviation magnitude DVoxslow having been set (updated) at a step 1135 to be stated later, on the occasion of the last execution of this routine. Besides, "$\Delta t$" is a time period having lapsed since the time of the last execution of this routine till the time of the current execution thereof.

Subsequently, the CPU 71 proceeds to a step 1125, at which the sub-feedback correction magnitude DFisub is evaluated in accordance with the above formula (4). Thereafter, the CPU 71 proceeds to a step 1130, at which the low-pass-filtered output deviation magnitude DVoxslow evaluated at the step 1115 is added to the integral value SDVoxslow of the low-pass-filtered output deviation magnitude at that time, thereby to evaluate the new integral value SDVoxslow of the low-pass-filtered output deviation magnitude. At the subsequent step 1135, the low-pass-filtered output deviation magnitude DVoxslow evaluated at the step 1115 is set as the last value DVoxslow1 of the low-pass-filtered output deviation magnitude DVoxslow. Thereafter, the CPU 71 proceeds to a step 1195 and ends this routine once.

In the above way, the sub-feedback correction magnitude DFisub is evaluated, and this sub-feedback correction magnitude DFisub is reflected upon the command final fuel injection quantity Fi(k) by the step 935 in FIG. 9 as stated before, whereby the air/fuel ratio control of the engine as based on the foregoing sub-feedback control is performed.

On the other hand, when the sub-feedback control condition does not hold true on the occasion of the decision of the step 1105, the CPU 71 renders the decision as "No" at the step 1105 and proceeds to a step 1140, at which the value of the sub-feedback correction magnitude DFisub is set at "0". Thereafter, the CPU 71 proceeds to the step 1195 and ends this routine once. In this manner, when the sub-feedback control condition does not hold true, the sub-feedback correction magnitude DFisub is set at "0", and the correction of the air/fuel ratio of the engine as based on the sub-feedback control is not made.

(Computation of Basic-Fuel-Injection-Quantity Correction Coefficient, and Storage Thereof)

Figure 12:
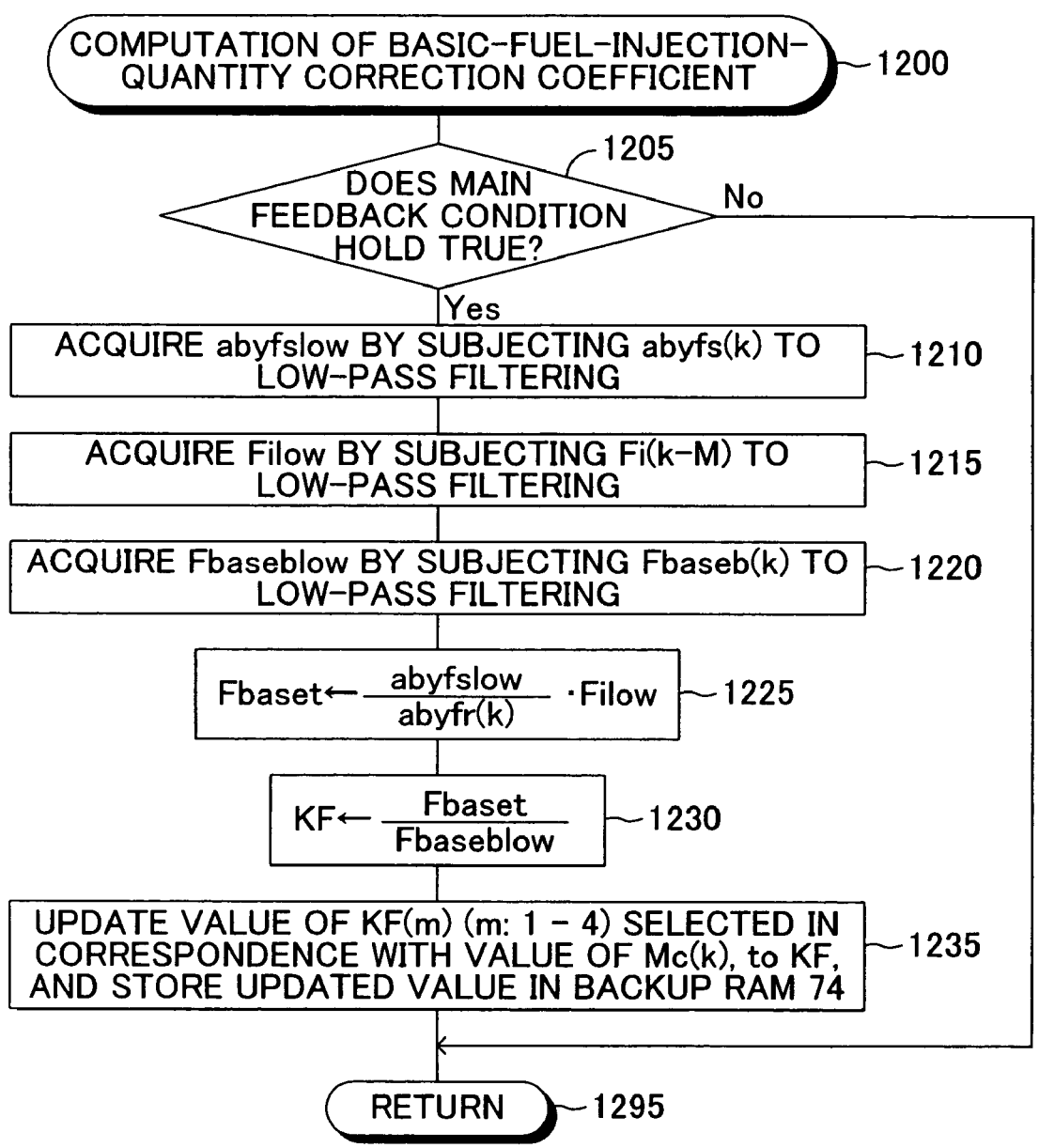
FIG. 12 is a flow chart showing a routine for computing a basic-fuel-injection-quantity correction magnitude as is executed by the CPU shown in FIG. 1.

Next, there will be described the operation in the case of calculating the basic-fuel-injection-quantity correction coefficient KF. The CPU 71 iteratively executes a routine shown by a flow chart in FIG. 12, each time a fuel injection start timing (injection instruction start time) arrives for the fuel injection cylinder. Accordingly, when the fuel injection start timing arrives for the fuel injection cylinder, the CPU 71 starts processing from a step 1200 and proceeds to a step 1205, at which it decides whether or not a main feedback control condition holds true. Subject to the decision of "No", the CPU 71 immediately proceeds to a step 1295 and ends this routine once. In this case, neither the computation of the basic-fuel-injection-quantity correction coefficient KF nor the process of the storage of the value of the correction coefficient KF into the backup RAM 74 is executed. The main feedback condition here is the same as the main feedback condition at the foregoing step 915 (step 1005).

Figure 10:
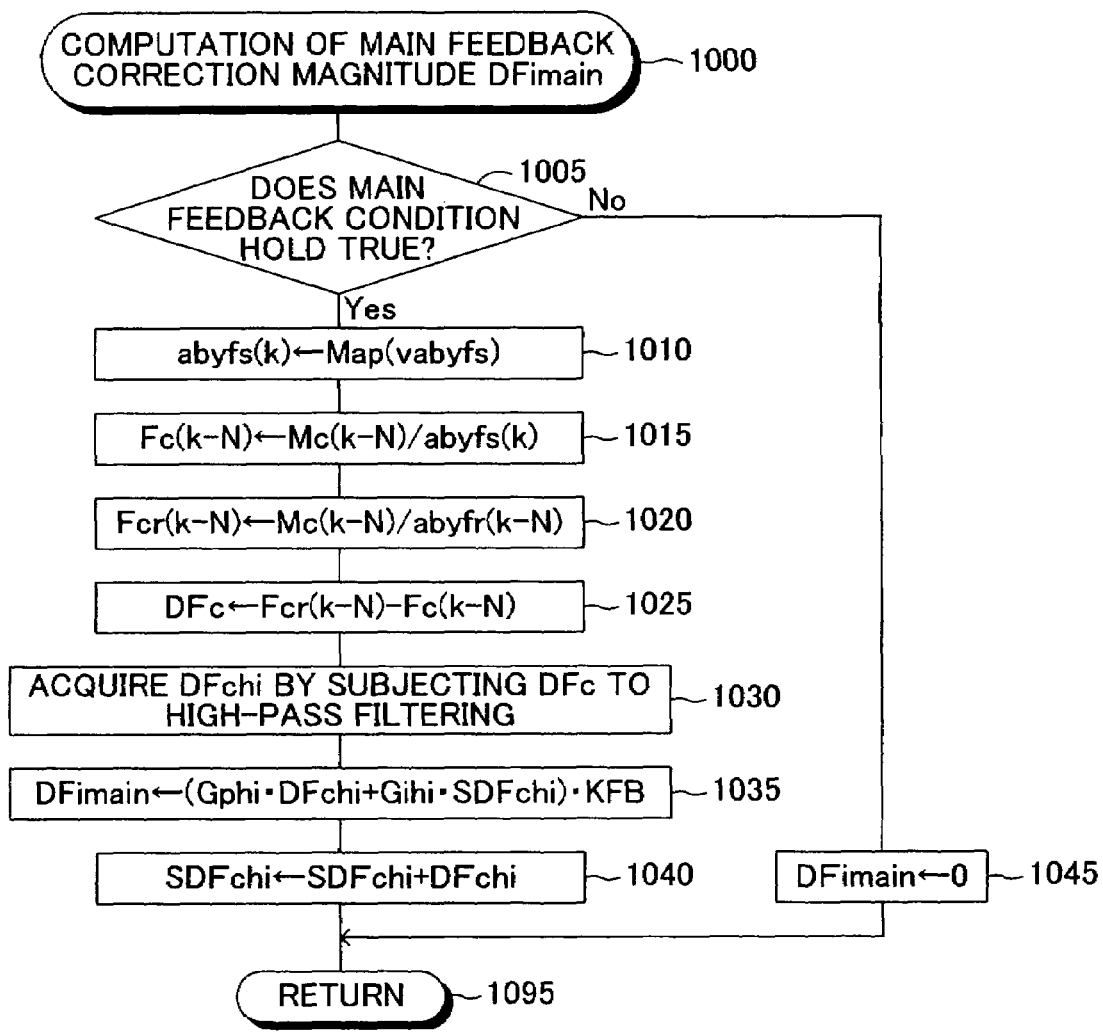
FIG. 10 is a flow chart showing a routine for computing a main feedback correction magnitude as is executed by the CPU shown in FIG. 1.

Now, the description will be continued assuming that the main feedback condition holds true. The CPU 71 renders the decision as "Yes" at the step 1205 and proceeds to a step 1210, at which the low-pass-filtered detection air/fuel ratio abyfslow is acquired in such a way that the current detection air/fuel ratio abyfs(k) having been evaluated at the foregoing step 1005 in FIG. 10 is subjected to low-pass filtering by the low-pass filter A17a.

Subsequently, the CPU 71 proceeds to a step 1215, at which the low-pass-filtered command final fuel injection quantity Filow is acquired in such a way that the value M is evaluated on the basis of the engine revolution speed NE at the present time, the current in-cylinder intake air quantity Mc(k) evaluated at the foregoing step 905 in FIG. 9, and the table MapM shown in FIG. 6, and that the command final fuel injection quantity Fi(k−M) preceding the M strokes from the present time is subjected to low-pass filtering by the low-pass filter A17c.

Subsequently, the CPU 71 proceeds to a step 1220, at which the low-pass-filtered uncorrected command basic fuel injection quantity Fbaseblow is acquired in such a way that the current uncorrected command basic fuel injection quantity Fbaseb(k) evaluated at the foregoing step 910 in FIG. 9 is subjected to low-pass filtering by the low-pass filter A17e.

Next, the CPU 71 proceeds to a step 1225, at which the target command basic fuel injection quantity Fbaset is evaluated on the basis of the low-pass-filtered detection air/fuel ratio abyfslow acquired above, the low-pass-filtered command final fuel injection quantity Filow acquired above, the current target air/fuel ratio abyfr(k) used at the foregoing step 910 in FIG. 9, and the above formula (11). At the subsequent step 1230, the basic-fuel-injection-quantity correction coefficient KF is evaluated on the basis of the target command basic fuel injection quantity Fbaset, the low-pass-filtered uncorrected command basic fuel injection quantity Fbaseblow acquired above, and the above formula (12).

In addition, the CPU 71 proceeds to a step 1235, at which the value KF(m) (m: 1-4) selected in correspondence with the value of the in-cylinder intake air quantity Mc(k) as has been determined at the step 905 in FIG. 9 is updated to the value of the basic-fuel-injection-quantity correction coefficient KF as has been evaluated above, and the value of the updated KF(m) is stored in the corresponding memory of the backup RAM 74. Thereafter, the CPU 71 proceeds to the step 1295 and ends this routine once.

Thus, in the case where the main feedback condition holds true, the computation (updating) of the basic-fuel-injection-quantity correction coefficient KF and the process for storing the value of the correction coefficient KF in the backup RAM 74 are executed each time the fuel injection start timing arrives for the fuel injection cylinder. In addition, the basic-fuel-injection-quantity correction coefficient KF is used at the step 920 of the foregoing routine in FIG. 9 as is executed for the fuel injection cylinder at the next time, whereby the uncorrected command basic fuel injection quantity Fbaseb at the next time is successively corrected in accordance with the basic-fuel-injection-quantity correction coefficient KF computed at current time.

As thus far described, in accordance with the embodiment of the air/fuel ratio control apparatus for the internal combustion engine according to the invention, under the assumption that the in-cylinder intake air quantities which are imbibed into the combustion chamber are constant, the target command basic fuel injection quantity Fbaset (=(abyfs(k)/abyfr(k))·Fi(k−M)) is evaluated from the relationship that the product between the command final fuel injection quantity Fi (actually, Fi(k−M)) and the detection air/fuel ratio abyfs(k) based on the upstream-side air/fuel ratio sensor 66 is equal to the product between the target command basic fuel injection quantity Fbaset, which is required in order that the actual air/fuel ratio of the mixture to be fed into the engine may be made the target air/fuel ratio abyfr(k), and this target air/fuel ratio abyfr(k), and the evaluated target command basic fuel injection quantity Fbaset is divided by the uncorrected command basic fuel injection quantity Fbaseb(k), thereby to evaluate the basic-fuel-injection-quantity correction coefficient KF (=Fbaset/Fbaseb(k)) (actually, the low-pass filtering is conjointly executed).

In addition, the uncorrected command basic fuel injection quantity Fbaseb at the next time is multiplied by the basic-fuel-injection-quantity correction coefficient KF, whereby the uncorrected command basic fuel injection quantity Fbaseb at the next time is successively corrected (that is, the corrected command basic fuel injection quantity Fbase at the next time is successively determined). Accordingly, the next corrected command basic fuel injection quantity Fbase is successively determined so as to agree with (approach to) the fuel injection quantity which ought to be given as the injection instruction in order that the actual air/fuel ratio of the mixture to be fed into the engine may be made the target air/fuel ratio abyfr, with the result that the error of the basic fuel injection quantity is successively compensated rapidly while the air/fuel ratio of the mixture to be fed into the engine is being controlled toward the target air/fuel ratio abyfr.

The invention is not restricted to the individual embodiments described above, but it can adopt various modified embodiments within the scope thereof. By way of example, in the above embodiments, as indicated in FIG. 7 (the steps 1210-1220 in FIG. 12), the basic-fuel-injection-quantity correction coefficient KF is evaluated by employing the individual values obtained after the detection air/fuel ratio abyfs(k), command final fuel injection quantity Fi(k−M) and uncorrected command basic fuel injection quantity Fbaseb(k) have been respectively subjected to the low-pass filtering operations by the low-pass filters. The apparatus, however, may well be configured so as to evaluate the basic-fuel-injection-quantity correction coefficient KF in such a way that an un-low-pass-filtered basic-fuel-injection-quantity correction coefficient KFb (=(abyfs(k)·Fi(k−M))/(abyfr(k)·Fbaseb(k))) is evaluated from the values themselves of the detection air/fuel ratio abyfs(k), command final fuel injection quantity Fi(k−M) and uncorrected command basic fuel injection quantity Fbaseb(k), and that the un-low-pass-filtered basic-fuel-injection-quantity correction coefficient KFb is subjected to low-pass filtering by a low-pass filter.

Figure 6:
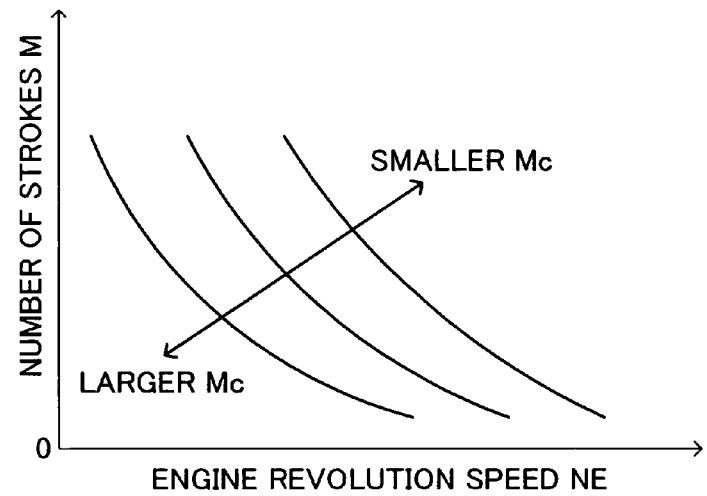
FIG. 6 is a graph showing a table which prescribes the relationship between an engine revolution speed as well as an in-cylinder intake air quantity and the number of strokes corresponding to a delay time, and to which a CPU shown in FIG. 1 refers.

Besides, in the above embodiment, the value M (value corresponding to the delay time) for the command final fuel injection quantity Fi(k−M) preceding the M strokes from the present time as is used in evaluating the basic-fuel-injection-quantity correction coefficient KF is evaluated on the basis of the engine revolution speed NE, the in-cylinder intake air quantity Mc(k) and the table MapMc shown in FIG. 6, but the value M may well be set at a predetermined constant value.

Besides, in the above embodiment, as shown in FIG. 7, the basic-fuel-injection-quantity correction coefficient KF is evaluated on the basis of the detection air/fuel ratio abyfs(k) at the current time, the command final fuel injection quantity Fi(k−M) preceding the M strokes from the present time, the target air/fuel ratio abyfr(k) at the current time, and the uncorrected command basic fuel injection quantity Fbaseb(k) at the current time. The apparatus, however, may well be configured so as to evaluate the basic-fuel-injection-quantity correction coefficient KF on the basis of the detection air/fuel ratio abyfs(k) at the current time, the command final fuel injection quantity Fi(k−M) preceding the M strokes from the present time, the target air/fuel ratio abyfr(k−M) preceding the M strokes from the present time, and the uncorrected command basic fuel injection quantity Fbaseb(k−M) preceding the M strokes from the present time.

Besides, in the above embodiment, in the main feedback control, the main feedback correction magnitude DFimain is evaluated on the basis of the in-cylinder fuel feed quantity deviation DFc which is the value obtained in such a way that the actual in-cylinder fuel feed quantity Fc(k−N) preceding the N strokes from the present time is subtracted from the target in-cylinder fuel feed quantity Fcr(k−N) preceding the N strokes from the present time. The apparatus, however, may well be configured so as to evaluate the main feedback correction magnitude DFimain on the basis of a value obtained in such a way that the target air/fuel ratio abyfr(k−N) preceding the N strokes from the present time is subtracted from the detection air/fuel ratio abyfs(k) at the current time as based on the upstream-side air/fuel ratio sensor 66.

The invention claimed is:

1. An air/fuel ratio control apparatus for an internal combustion engine as is applied to the internal combustion engine, having:
   a catalyst which is disposed in an exhaust passage of the internal combustion engine;
   an upstream-side air/fuel ratio sensor which is disposed in a part of the exhaust passage as lies in an upstream of the catalyst;
   a downstream-side air/fuel ratio sensor which is disposed in a part of the exhaust passage as lies in a downstream of the catalyst; and
   fuel injection means for injecting fuel in compliance with an instruction;
   the air/fuel ratio control apparatus comprising:
   command basic-fuel-injection-quantity acquisition means for acquiring a fuel quantity for obtaining a target air/fuel ratio, as a command basic fuel injection quantity, from an in-cylinder intake air quantity which is estimated on the basis of a running state of the internal combustion engine;

main-feedback-correction-magnitude calculation means for calculating a main feedback correction magnitude on the basis of a value obtained after a value which is based on a difference between an output value of the upstream-side air/fuel ratio sensor and a predetermined upstream-side target value has been subjected to predetermined high-pass filtering, or a value obtained after the output value of the upstream-side air/fuel ratio sensor has been subjected to predetermined high-pass filtering;

sub-feedback-correction-magnitude calculation means for calculating a sub-feedback correction magnitude on the basis of an output value of the downstream-side air/fuel ratio sensor and a predetermined downstream-side target value;

command basic-fuel-injection-quantity correction means for correcting the command basic fuel injection quantity so that a fuel quantity which the fuel injection means actually injects when it has received the injection instruction of the fuel of the command basic fuel injection quantity may become a quantity which is required for making an actual air/fuel ratio of a mixture to be fed into the engine, the target air/fuel ratio;

command final-fuel-injection-quantity calculation means for calculating a command final fuel injection quantity in such a way that the corrected command basic fuel injection quantity is corrected by the main feedback correction magnitude and the sub-feedback correction magnitude; and air/fuel ratio control means for feedback-controlling the air/fuel ratio of the mixture to be fed into the engine, in such a way that the injection instruction of the fuel of the command final fuel injection quantity is given to the fuel injection means, wherein said command basic-fuel-injection-quantity correction means is configured so as to calculate a parameter value for correcting the command basic fuel injection quantity, on the basis of the output value of the upstream-side air/fuel ratio sensor, the command final fuel injection quantity, the target air/fuel ratio, and the command basic fuel injection quantity, and to correct the command basic fuel injection quantity by using the parameter value.

2. An air/fuel ratio control apparatus for an internal combustion engine as defined in claim 1, further comprising:
storage means for storing the parameter value for correcting the command basic fuel injection quantity as has been calculated by said command basic-fuel-injection-quantity correction means.

3. An air/fuel ratio control apparatus for an internal combustion engine as defined in claim 1, further comprising:
delay-time acquisition means for acquiring a delay time which is involved since the injection instruction of the fuel until an air/fuel ratio of exhaust gas based on combustion of the fuel injected in compliance with the injection instruction appears as the output value of the upstream-side air/fuel ratio sensor; wherein:
said command basic-fuel-injection-quantity correction means is configured so as to use a value concerning the injection instruction at a time preceding the delay time, as at least the command final fuel injection quantity, in calculating the parameter value for correcting the command basic fuel injection quantity.

4. An air/fuel ratio control apparatus for an internal combustion engine as defined in claim 3, further comprising:
storage means for storing the parameter value for correcting the command basic fuel injection quantity as has been calculated by said command basic-fuel-injection-quantity correction means.

5. An air/fuel ratio control apparatus for an internal combustion engine as defined in claim 3, wherein:
said delay-time acquisition means is configured so as to alter the delay time in accordance with a running state of the internal combustion engine.

6. An air/fuel ratio control apparatus for an internal combustion engine as defined in claim 5, further comprising:
storage means for storing the parameter value for correcting the command basic fuel injection quantity as has been calculated by said command basic-fuel-injection-quantity correction means.

7. An air/fuel ratio control apparatus for an internal combustion engine as defined in claim 1, wherein:
the parameter value for correcting the command basic fuel injection quantity as is calculated by said command basic-fuel-injection-quantity correction means has been subjected to predetermined low-pass filtering.

8. An air/fuel ratio control apparatus for an internal combustion engine as defined in claim 7, further comprising:
storage means for storing the parameter value for correcting the command basic fuel injection quantity as has been calculated by said command basic-fuel-injection-quantity correction means.

9. An air/fuel ratio control apparatus for an internal combustion engine as defined in claim 7, further comprising:
delay-time acquisition means for acquiring a delay time which is involved since the injection instruction of the fuel until an air/fuel ratio of exhaust gas based on combustion of the fuel injected in compliance with the injection instruction appears as the output value of the upstream-side air/fuel ratio sensor; wherein:
said command basic-fuel-injection-quantity correction means is configured so as to use a value concerning the injection instruction at a time preceding the delay time, as at least the command final fuel injection quantity, in calculating the parameter value for correcting the command basic fuel injection quantity.

10. An air/fuel ratio control apparatus for an internal combustion engine as defined in claim 9, further comprising:
storage means for storing the parameter value for correcting the command basic fuel injection quantity as has been calculated by said command basic-fuel-injection-quantity correction means.

11. An air/fuel ratio control apparatus for an internal combustion engine as defined in claim 9, wherein:
said delay-time acquisition means is configured so as to alter the delay time in accordance with a running state of the internal combustion engine.

12. An air/fuel ratio control apparatus for an internal combustion engine as defined in claim 11, further comprising:
storage means for storing the parameter value for correcting the command basic fuel injection quantity as has been calculated by said command basic-fuel-injection-quantity correction means.

* * * * *